United States Patent
Du et al.

(10) Patent No.: US 12,465,319 B2
(45) Date of Patent: Nov. 11, 2025

(54) ULTRASONIC BLOOD FLOW IMAGING METHOD AND ULTRASONIC IMAGING APPARATUS

(71) Applicant: SHENZHEN MINDRAY BIO-MEDICAL ELECTRONICS CO., LTD., Guangdong (CN)

(72) Inventors: Yigang Du, Shenzhen (CN); Yongqiang Dong, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 0 days.

(21) Appl. No.: 18/597,608

(22) Filed: Mar. 6, 2024

(65) Prior Publication Data

US 2024/0206845 A1   Jun. 27, 2024

Related U.S. Application Data

(63) Continuation of application No. PCT/CN2022/117632, filed on Sep. 7, 2022.

(30) Foreign Application Priority Data

Sep. 9, 2021 (CN) .......................... 202111056959.3

(51) Int. Cl.
*A61B 8/06* (2006.01)
*A61B 8/00* (2006.01)

(52) U.S. Cl.
CPC ............... *A61B 8/06* (2013.01); *A61B 8/463* (2013.01); *A61B 8/488* (2013.01); *A61B 8/5223* (2013.01); *A61B 8/5246* (2013.01)

(58) Field of Classification Search
CPC ..... G01S 15/8984; A61B 8/06; A61B 8/5223; A61B 8/496; A61B 8/488
See application file for complete search history.

(56) References Cited

U.S. PATENT DOCUMENTS 4,534,357 A * 8/1985 Powers ..................... A61B 8/06
                                                                        600/455
5,708,683 A * 1/1998 Kim ........................ H04L 25/05
                                                                        375/377
(Continued)

FOREIGN PATENT DOCUMENTS

CN      104011559 A    8/2014
CN      106102587 A    11/2016
(Continued)

OTHER PUBLICATIONS

First Search dated Sep. 26, 2024, issued in related Chinese Patent Application No. 202111056959.3 (3 pages).
(Continued)

*Primary Examiner* — John D Li
(74) *Attorney, Agent, or Firm* — Sheppard Mullin Richter & Hampton LLP

(57) ABSTRACT

An ultrasonic blood flow imaging method includes: transmitting first, second and third ultrasonic waves to a to-be-measured blood flow position of a target object at a first transmitting angle to acquire a first projection component of a blood flow velocity vector, with a first pulse repetition frequency between the first ultrasonic waves and the second ultrasonic waves and a second pulse repetition frequency between the second ultrasonic waves and the third ultrasonic waves; transmitting fourth, fifth and sixth ultrasonic waves to the to-be-measured blood flow position at a second transmitting angle to acquire a second projection component of a blood flow velocity vector, with a third pulse repetition frequency between the fourth ultrasonic waves and the fifth ultrasonic waves and a fourth pulse repetition frequency between the fifth ultrasonic waves and the sixth ultrasonic waves.

20 Claims, 6 Drawing Sheets

(56) References Cited

U.S. PATENT DOCUMENTS

| | | | |
|---|---|---|---|
| 6,182,101 B1* | 1/2001 | Vahatalo | H03H 17/0685 |
| | | | 708/313 |
| 11,432,805 B2 | 9/2022 | Flynn et al. | |
| 2008/0210016 A1* | 9/2008 | Zwirn | A61B 8/06 |
| | | | 73/861.18 |
| 2009/0182236 A1* | 7/2009 | Jeong | G01S 15/8979 |
| | | | 600/455 |
| 2018/0085087 A1 | 3/2018 | Kawabata et al. | |
| 2018/0146952 A1 | 5/2018 | Du et al. | |
| 2018/0333139 A1* | 11/2018 | Misono | A61B 8/5284 |
| 2019/0022426 A1* | 1/2019 | Mourad | A61N 7/00 |
| 2019/0199394 A1* | 6/2019 | Richardson | G01S 19/30 |
| 2021/0007706 A1* | 1/2021 | Du | A61B 8/461 |
| 2021/0267568 A1* | 9/2021 | Duffy | A61B 8/085 |
| 2021/0338193 A1* | 11/2021 | Kuenen | G01S 15/8979 |

FOREIGN PATENT DOCUMENTS

| | | |
|---|---|---|
| CN | 106580372 A | 4/2017 |
| CN | 107495985 A | 12/2017 |
| CN | 110074818 A | 8/2019 |
| CN | 110613477 A | 12/2019 |
| CN | 110811688 A | 2/2020 |
| CN | 111093515 A | 5/2020 |
| CN | 112672694 A | 4/2021 |
| CN | 113116380 A | 7/2021 |
| JP | H-0492649 A | 3/1992 |

OTHER PUBLICATIONS

PCT International Search Report and the Written Opinion mailed Nov. 25, 2022, issued in related International Application No. PCT/CN2022/117632, with partial English translation (8 pages).

* cited by examiner

ULTRASONIC BLOOD FLOW IMAGING METHOD AND ULTRASONIC IMAGING APPARATUS

CROSS-REFERENCE TO RELATED APPLICATIONS

The application is a continuation application of International Patent Application No. PCT/CN2022/117632 filed on Sep. 7, 2022, which is based on and claims priority to and benefits of Chinese Patent Application No. 202111056959.3, filed on Sep. 9, 2021. The entire content of all of the above-referenced applications is incorporated herein by reference.

TECHNICAL FIELD

The present disclosure relates to ultrasound imaging, and more particularly to ultrasonic blood flow imaging methods and ultrasonic imaging apparatus.

BACKGROUND OF THE INVENTION

With regard to ultrasonic blood flow imaging based on Doppler's principle, if an actual blood flow velocity exceeds the maximum measurable velocity of an imaging system, measured results may be aliased, resulting in incorrect measured values. The maximum measurable velocity may be improved by increasing a pulse repetition frequency (PRF) and decreasing the center frequency of transmitted waveform. However, due to the limitation of sound speed and imaging depth, PRF cannot be improved indefinitely. When multiple transmitting angles are used during ultrasonic vector blood flow imaging, the PRF used to calculate velocity among the same angles may be lower due to the limitation of the imaging depth, and it is more likely to cause aliasing, resulting in incorrect measured value. Vector blood flow imaging focuses more on the accuracy of quantitative measurement, so aliasing should be avoided.

SUMMARY OF THE INVENTION

The present application has been made to solve at least one of the problems mentioned above. An ultrasonic blood flow imaging method provided according to an aspect of the present disclosure may include: transmitting first ultrasonic waves, second ultrasonic waves and third ultrasonic waves to a to-be-measured blood flow position of a target object at a first transmitting angle and receiving echoes of said ultrasonic waves so as to acquire first echo signals, second echo signals and third echo signals, with a first pulse repetition frequency between the first ultrasonic waves and the second ultrasonic waves and a second pulse repetition frequency between the second ultrasonic waves and the third ultrasonic waves, and the first pulse repetition frequency being a non-integer multiple of the second pulse repetition frequency; transmitting fourth ultrasonic waves, fifth ultrasonic waves and sixth ultrasonic waves to the to-be-measured blood flow position at a second transmitting angle different from the first transmitting angle and receiving echoes of said ultrasonic waves so as to acquire fourth echo signals, fifth echo signals and sixth echo signals, with a third pulse repetition frequency between the fourth ultrasonic waves and the fifth ultrasonic waves and a fourth pulse repetition frequency between the fifth ultrasonic waves and the sixth ultrasonic waves, and the third pulse repetition frequency being a non-integer multiple of the fourth pulse repetition frequency; acquiring a first projection component of a blood flow velocity vector at the to-be-measured blood flow position at the first transmitting angle according to the first echo signals, the second echo signals, the third echo signals, the first pulse repetition frequency and the second pulse repetition frequency; acquiring a second projection component of the blood flow velocity vector at the to-be-measured blood flow position at the second transmitting angle according to the fourth echo signals, the fifth echo signals, the sixth echo signals, the third pulse repetition frequency and the fourth pulse repetition frequency; and combining the first projection component and the second projection component to acquire the blood flow velocity vector at the to-be-measured blood flow position.

An ultrasonic blood flow imaging method provided according to another aspect of the present disclosure may include: transmitting first ultrasonic waves, second ultrasonic waves, third ultrasonic waves and fourth ultrasonic waves to a to-be-measured blood flow position of a target object at a first transmitting angle and receiving echoes of said ultrasonic waves so as to acquire first echo signals, second echo signals, third echo signals and fourth echo signals, with a first pulse repetition frequency between the first ultrasonic waves and the second ultrasonic waves and a second pulse repetition frequency between the third ultrasonic waves and the fourth ultrasonic waves, and the first pulse repetition frequency being a non-integer multiple of the second pulse repetition frequency; transmitting fifth ultrasonic waves, sixth ultrasonic waves, seventh ultrasonic waves and eighth ultrasonic waves to the to-be-measured blood flow position at a second transmitting angle different from the first transmitting angle and receiving echoes of said ultrasonic waves so as to acquire fifth echo signals, sixth echo signals, seventh echo signals and eighth echo signals, with a third pulse repetition frequency between the fifth ultrasonic waves and the sixth ultrasonic waves and a fourth pulse repetition frequency between the seventh ultrasonic waves and the eighth ultrasonic waves, the third pulse repetition frequency being a non-integer multiple of the fourth pulse repetition frequency; acquiring a first projection component of a blood flow velocity vector at the to-be-measured blood flow position at the first transmitting angle according to the first echo signals, the second echo signals, the third echo signals, the fourth echo signals, the first pulse repetition frequency and the second pulse repetition frequency; acquiring a second projection component of the blood flow velocity vector at the to-be-measured blood flow position at the second transmitting angle according to the fifth echo signals, the sixth echo signals, the seventh echo signals, the eighth echo signals, the third pulse repetition frequency and the fourth pulse repetition frequency; and combining the first projection component and the second projection component to acquire the blood flow velocity vector at the to-be-measured blood flow position.

An ultrasonic blood flow imaging method provided according to yet another aspect of the present disclosure may include: transmitting first ultrasonic waves, second ultrasonic waves and third ultrasonic waves to a to-be-measured blood flow position of a target object at a first transmitting angle and receiving echoes of said ultrasonic waves so as to acquire first echo signals, second echo signals and third echo signals, with a first pulse repetition frequency between the first ultrasonic waves and the second ultrasonic waves and a second pulse repetition frequency between the second ultrasonic waves and the third ultrasonic waves, and the first pulse repetition frequency being a non-integer multiple of the second pulse repetition frequency; transmitting fourth ultrasonic waves, fifth ultrasonic waves, sixth ultrasonic waves and seventh ultrasonic waves to the to-be-measured blood flow position at a second transmitting angle different from the first transmitting angle and receiving echoes of said ultrasonic waves so as to acquire fourth echo signals, fifth echo signals, sixth echo signals and seventh echo signals, with a third pulse repetition frequency between the fourth ultrasonic waves and the fifth ultrasonic waves and a fourth pulse repetition frequency between the sixth ultrasonic waves and the seventh ultrasonic waves, and the third pulse repetition frequency being a non-integer multiple of the fourth pulse repetition frequency; acquiring a first projection component of a blood flow velocity vector at the to-be-measured blood flow position at the first transmitting angle according to the first echo signals, the second echo signals, the third echo signals, the first pulse repetition frequency and the second pulse repetition frequency; acquiring a second projection component of the blood flow velocity vector at the to-be-measured blood flow position at the second transmitting angle according to the fourth echo signals, the fifth echo signals, the sixth echo signals, the seventh echo signals, the third pulse repetition frequency and the fourth pulse repetition frequency; and combining the first projection component and the second projection component to acquire the blood flow velocity vector at the to-be-measured blood flow position.

An ultrasonic imaging apparatus provided according to still yet another aspect of the present disclosure may include a transmitting circuit, a receiving circuit, an ultrasonic probe and a processor, wherein the transmitting circuit may be configured to control the ultrasonic probe to transmit ultrasonic waves to a to-be-measured blood flow position of a target object; the receiving circuit may be configured to control the ultrasonic probe to receive echoes of said ultrasonic waves and acquire echo signals from the echoes of said ultrasonic waves; the processor may be configured to perform ultrasonic blood flow imaging based on the echo signals; and the processor may be further configured to perform the ultrasonic blood flow imaging method mentioned above.

In the ultrasonic blood flow imaging methods and the ultrasonic imaging apparatus according to the embodiments of the present disclosure, ultrasonic waves are transmitted to the to-be-measured blood flow position of the target object at least two transmitting angles, with a non-uniform PRF adopted to transmit ultrasonic waves at each transmitting angle, so that a larger actual PRF can be achieved, thereby improving the maximum measurable velocity and thus the measurement accuracy of the to-be-measured blood flow position blood flow velocity vector.

BRIEF DESCRIPTION OF THE DRAWINGS

The above and other objects, features and advantages of the present disclosure will become more apparent by describing in detail embodiments thereof with reference to the attached drawings. The accompanying drawings are intended to provide a further understanding of the present disclosure and incorporated in and constitute a part of the specification. They are used to illustrate the present disclosure together with the embodiments and are not to be construed as limiting the present disclosure. In the drawings, like reference numerals generally refer to like parts or steps.

DETAILED DESCRIPTION

In order to make the objectives, technical solutions, and advantages of the present disclosure clearer, example embodiments according to the present disclosure will be described in detail below with reference to the accompanying drawings. Apparently, the described embodiments are merely some rather than all of the embodiments of the present disclosure. It should be understood that the example embodiments described herein do not constitute any limitation to the present disclosure. All other embodiments derived by those skilled in the art without creative efforts on the basis of the embodiments of the present disclosure described herein shall fall within the scope of protection of the present disclosure.

Figure 1:
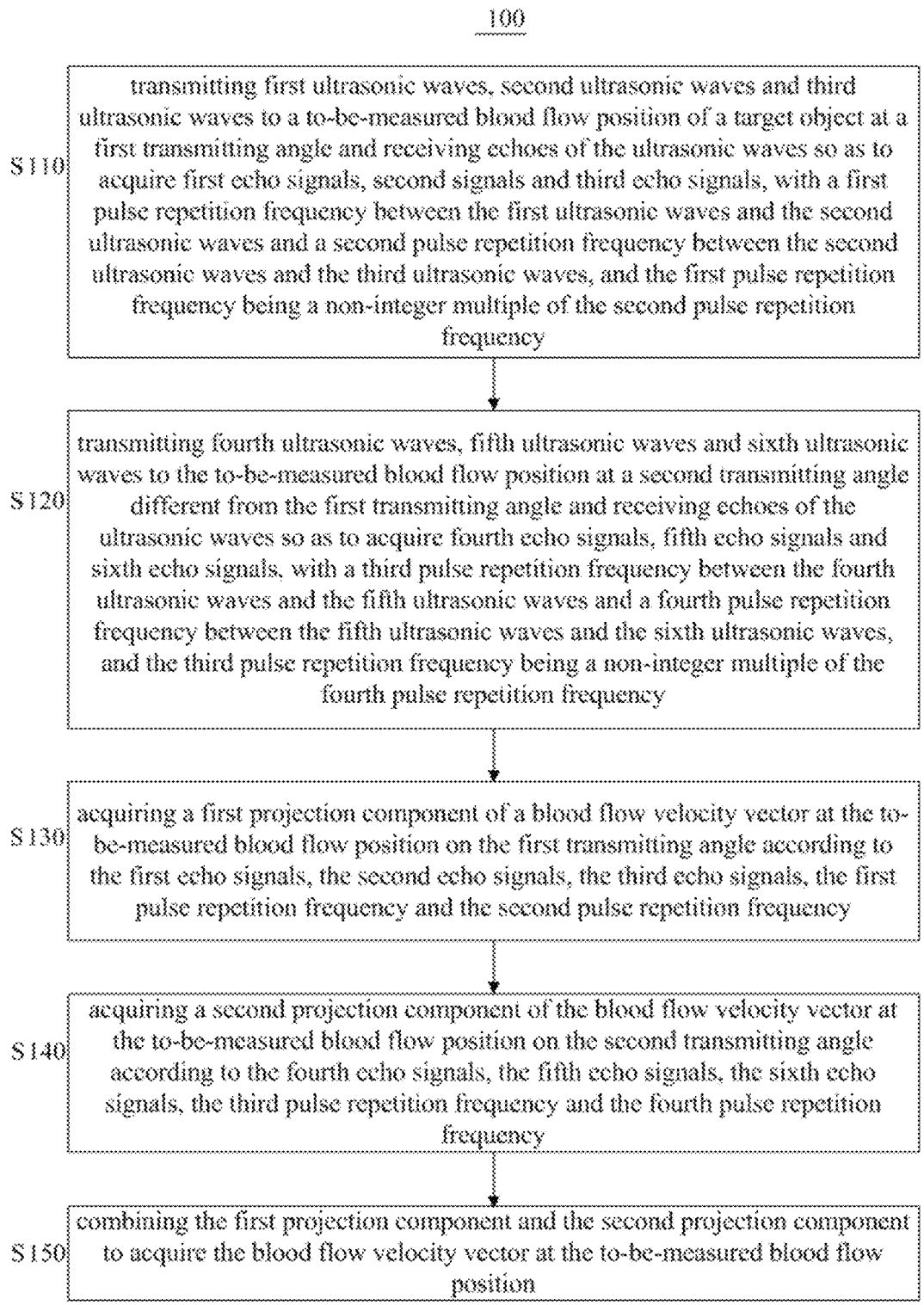
FIG. 1 is a schematic flowchart of an ultrasonic blood flow imaging method according to an embodiment of the present disclosure.

FIG. 1 shows a schematic flowchart of an ultrasonic blood flow imaging method 100 according to an embodiment of the present disclosure. As shown in FIG. 1, the ultrasonic blood flow imaging method 100 may include the following steps:

Step S110: transmitting first ultrasonic waves, second ultrasonic waves and third ultrasonic waves to a to-be-measured blood flow position of a target object at a first transmitting angle and receiving echoes of the ultrasonic waves so as to acquire first echo signals, second echo signals and third echo signals, with a first pulse repetition frequency between the first ultrasonic waves and the second ultrasonic waves and a second pulse repetition frequency between the second ultrasonic waves and the third ultrasonic waves, and the first pulse repetition frequency being a non-integer multiple of the second pulse repetition frequency;

Step S120: transmitting fourth ultrasonic waves, fifth ultrasonic waves and sixth ultrasonic waves to the to-be-measured blood flow position at a second transmitting angle different from the first transmitting angle and receiving echoes of the ultrasonic waves so as to acquire fourth echo signals, fifth echo signals and sixth echo signals, with a third pulse repetition frequency between the fourth ultrasonic waves and the fifth ultrasonic waves and a fourth pulse repetition frequency between the fifth ultrasonic waves and the sixth ultrasonic waves, and the third pulse repetition frequency being a non-integer multiple of the fourth pulse repetition frequency;

Step S130: acquiring a first projection component of a blood flow velocity vector at the to-be-measured blood flow position at the first transmitting angle according to the first echo signals, the second echo signals, the third echo signals, the first pulse repetition frequency and the second pulse repetition frequency;

Step S140: acquiring a second projection component of the blood flow velocity vector at the to-be-measured blood flow position at the second transmitting angle according to the fourth echo signals, the fifth echo signals, the sixth echo signals, the third pulse repetition frequency and the fourth pulse repetition frequency; and Step S150: combining the first projection component and the second projection component to acquire the blood flow velocity vector at the to-be-measured blood flow position.

In an embodiment of the present disclosure, ultrasonic waves are transmitted to the to-be-measured blood flow position of the target object at at least two transmitting angles, with at least two pulse repetition frequencies (PRFs) that are in a non-integer multiple relationship between the ultrasonic waves transmitted at each transmitting angle, which mean that the ultrasonic waves are transmitted with non-uniform PRFs for each transmitting angle. In this way, a larger actual PRF can be achieved to improve the maximum measurable velocity, thereby enhancing the measurement accuracy of the blood flow velocity vector at the to-be-measured blood flow position. The reason why the ultrasonic blood flow imaging method 100 can improve the maximum measurable velocity is described in detail below.

First the blood flow velocity based on Doppler's principle may be calculated according to the following formula (1):

$$v_z = -\frac{cf_{PRF}}{4\pi f_0} \arctan\left(\frac{\Im\{R(1)\}}{\Re\{R(1)\}}\right) \text{ where} \quad (1)$$

$$R(1) = \frac{1}{N-1}\sum_{i=1}^{N-1} x(i)x(i+1) + y(i)y(i+1) + j[y(i+1)x(i) - x(i+1)y(i)]$$

In the above formula (1), $v_z$ represents a blood flow velocity component measured along the direction of ultrasound propagation, $f_0$ represents a center frequency of the signal transmitted by the probe, and $f_{PRF}$ represents a pulse repetition frequency (namely the reciprocal of time interval between two adjacent transmissions). N in the expression of R(1) is the number of transmissions at the same position, x(i) represents the real part of a signal that is processed after an ith transmission and reception, y(i) represents the imaginary part of the signal that is processed after the ith transmission and reception, $\Im$ is an imaginary operator, $\Re$ is a real operator, and j is an imaginary unit.

Let $$A = \frac{\Im\{R(1)\}}{\Re\{R(1)\}}$$

and the variation range of arctan (A) be $(-\pi\pi]$ for convenience of expression, then the maximum measurable velocity (absolute value) of formula (1) can be expressed as:

$$v_{max} = \frac{cf_{PRF}}{4f_0}$$

The velocity measuring range of formula (1) can be expressed as $[-v_{max}, v_{max})$. When the actual velocity is greater than $v_{max}$ or less than $-v_{max}$, a measured result will be aliased (please note that the actual velocity here refers to the actual value of the velocity component in the direction of ultrasound emission, which is also measured). A correct measured value of velocity component should be:

$$v_{z-corr} = -\frac{cf_{PRF}}{4\pi f_0}\arctan(A) + 2Mv_{max} \quad (2)$$

When no aliasing occurs, M=0, and formula (2) may be equivalent to formula (1). When aliasing occurs, M is a non-zero integer, including both positive and negative integers, such as −3, −2, −1, 1, 2, 3, and so on. Since M is unknown, more information is needed to make it possible.

Accordingly, in the ultrasonic blood flow imaging method 100 in an embodiment of the present disclosure, ultrasonic waves are transmitted to the to-be-measured blood flow position of the target object at two transmitting angles, with two different PRFs between the ultrasonic waves transmitted at each transmitting angle. Take the two PRFs corresponding to the first transmitting angle as an example, representing the first pulse repetition frequency as $f_{PRF1}$ and the second pulse repetition frequency as $f_{PRF2}$. Based on this, formula (2) can be extended to an equation set containing two PRFs:

$$v_{z-corr} = -\frac{cf_{PRF1}}{4\pi f_0}\arctan(A_1) + 2Mv_{max1} \quad (3)$$

$$v_{z-corr} = -\frac{cf_{PRF2}}{4\pi f_0}\arctan(A_2) + 2Nv_{max2} \quad (4)$$

Although there are three unknowns (i.e., $v_{z-corr}$, M and N) for the two equations in formulas (3), (4), the equation set is also solvable under certain circumstances because M and N are integers.

First, aliasing occurs first when PRF is small, so when $f_{PRF1} > f_{PRF2}$, then $|M| \leq |N|$; conversely, when $f_{PRF1} < f_{PRF2}$, then $|M| \geq |N|$.

To further simplify, let:

$$B_1 = -\frac{cf_{PRF1}}{4\pi f_0}\arctan(A_1),$$

$$B_2 = -\frac{cf_{PRF2}}{4\pi f_0}\arctan(A_2),$$

Then formulas (3) and (4) can be further expressed as:

$$v_{z-corr} = B_1 + 2Mv_{max1} \quad (5)$$

$$v_{z-corr} = B_2 + 2Nv_{max2} \quad (6)$$

where, $|B_1|\le v_{max1}$, $|B_2|\le v_{max2}$, combine (5) and (6) and obtain:

$$B_1 - B_2 = 2(Nv_{max2} - Mv_{max1}) \quad (7)$$

In formula (7), $B_1$, $B_2$, $v_{max1}$, and $v_{max2}$ are given. Different M and N can be tried to make formula (7) as valid as possible, which may be further formulated as:

$$\underset{M,N}{\operatorname{argmin}}|(B_1 - B_2) - 2(Nv_{max2} - Mv_{max1})| \quad (8)$$

subject to M, N∈ ℤ

In formula (8), ℤ represents a set of integers. It is possible to find multiple sets of solutions for M and N by an exhaustive method, and then the M or N with the minimum absolute value into formula (3) or (4) to calculate the actual velocity without aliasing.

Since there are two unknowns in formula (7), M and N, there will be infinitely many sets of solutions in order for this equation to work. Thus, there may be a measured result corresponding to the calculation of every set of M and N, so that there are an infinite number of measured values, which means that these measured values may be the actual blood flow velocity. Considering that the blood flow velocity cannot be infinite, it is generally deemed that the measured value corresponding to M or N with the minimum absolute value is the actual velocity measured value. Of course, this is an assumption, and aliasing also occurs when the actual measured value is greater than the velocity measured value corresponding to M or N with the minimum absolute value. However, the maximum measurable velocity acquired in this way is much higher than that in traditional methods.

As a result, by the ultrasonic blood flow imaging method 100 in an embodiment of the present disclosure, the ultrasonic waves are transmitted to the to-be-measured blood flow position of the target object at at least two transmitting angles, with non-uniform PRFs to transmit the ultrasonic waves for each transmitting angle, thereby achieving a larger actual PRF to improve the maximum measurable velocity, further enhancing the measurement accuracy of the blood flow velocity vector at the to-be-measured blood flow position.

Here, it should be noted that the sequence from step S100 to step S150 of the ultrasonic blood flow imaging method 100 according to an embodiment of the present disclosure is not necessarily limited by its serial number; for example, step S120 may also follow step S130.

In an embodiment of the present disclosure, the step S130 of acquiring a first projection component of a blood flow velocity vector at the to-be-measured blood flow position at the first transmitting angle according to the first echo signals, the second echo signals, the third echo signals, the first pulse repetition frequency and the second pulse repetition frequency may comprise: acquiring a first blood flow velocity according to the first echo signals and the second echo signals, and acquiring a second blood flow velocity according to the second echo signals and the third echo signals; acquiring a first maximum measurable velocity corresponding to the first pulse repetition frequency and a second maximum measurable velocity corresponding to the second pulse repetition frequency; determining a first de-aliasing coefficient meeting a first predetermined condition according to the first blood flow velocity, the second blood flow velocity, the first maximum measurable velocity and the second maximum measurable velocity; and de-aliasing the first blood flow velocity and/or the second blood flow velocity based on the first de-aliasing coefficient to acquire the first projection component of the blood flow velocity vector at the to-be-measured blood flow position at the first transmitting angle.

The procedure for calculating the first projection component of the blood flow velocity vector at the to-be-measured blood flow position in this embodiment can be understood with reference to the formulas above. The first blood flow velocity may be considered as $B_1$ in formula (8), the second blood flow velocity may be considered as $B_2$ in formula (8), the first maximum measurable velocity may be considered as $v_{max1}$ in formula (8), the second maximum measurable velocity may be considered as $v_{max2}$, the first de-aliasing coefficient may be considered as M and/or N in formula (8), and the first predetermined condition may be understood as making formula (8) valid.

Accordingly, the step of determining a first de-aliasing coefficient meeting a first predetermined condition according to the first blood flow velocity, the second blood flow velocity, the first maximum measurable velocity and the second maximum measurable velocity may comprise: taking a difference value between the first blood flow velocity and the second blood flow velocity as a first difference value (i.e. $B_1-B_2$); taking twice a difference value between N times the second maximum measurable velocity and M times the first maximum measurable velocity as a second difference value (i.e. $2(Nv_{max2}-Mv_{max1})$), where N and M are integers; taking a difference value between the first difference value and the second difference value as a third difference value (i.e. $(B_1-B_2)-2(Nv_{max2}-Mv_{max1})$); and calculating to acquire a value result about M and N that minimizes an absolute value of the third difference value (i.e. formula (8)), and taking M and/or N in the value result as the first de-aliasing coefficient.

Since the value result of M corresponds to the first blood flow velocity $B_1$, when the value result of M being taken as the first de-aliasing coefficient, the first blood flow velocity is de-aliased based on the first de-aliasing coefficient to acquire the first projection component of blood flow velocity vector at the to-be-measured blood flow position at the first transmitting angle, that is, the first projection component of blood flow velocity vector at the to-be-measured blood flow position at the first transmitting angle may be calculated by the formula (5) mentioned above. Since the value result of N corresponds to the first blood flow velocity $B_2$, when the value result of N being taken as the first de-aliasing coefficient, de-aliasing the second blood flow velocity based on the first de-aliasing coefficient to acquire the first projection component of blood flow velocity vector at the to-be-measured blood flow position at the first transmitting angle, that is, the first projection component of blood flow velocity vector at the to-be-measured blood flow position at the first transmitting angle may be calculated by the formula (6) mentioned above. Alternatively, the projection component obtained by de-aliasing the first blood flow velocity using M as the first de-aliasing coefficient and the projection component obtained by de-aliasing the first blood flow velocity using N as the first de-aliasing coefficient may be averaged, and an averaged result therefrom may be taken as a final first projection component of blood flow velocity vector at the to-be-measured blood flow position at the first transmitting angle.

In an embodiment of the present disclosure, in a case that there are at least two groups of value results about M and N, M and/or N with a minimum absolute value in the value results may be taken as the first de-aliasing coefficient when minimizing the absolute value of the third difference value, which will be described later in connection with an example.

In an embodiment of the present disclosure, the step S140 of acquiring a second projection component of the blood flow velocity vector at the to-be-measured blood flow position at the second transmitting angle according to the fourth echo signals, the fifth echo signals, the sixth echo signals, the third pulse repetition frequency and the fourth pulse repetition frequency may comprise: acquiring a third blood flow velocity according to the fourth echo signals and the fifth echo signals, and acquiring a fourth blood flow velocity according to the fifth echo signals and the sixth echo signals; acquiring a third maximum measurable velocity corresponding to the third pulse repetition frequency and a fourth maximum measurable velocity corresponding to the fourth pulse repetition frequency; determining a second de-aliasing coefficient meeting a second predetermined condition according to the third blood flow velocity, the fourth blood flow velocity, the third maximum measurable velocity and the fourth maximum measurable velocity; and de-aliasing the third blood flow velocity and/or the fourth blood flow velocity based on the second de-aliasing coefficient to acquire the second projection component of the blood flow velocity vector at the to-be-measured blood flow position at the second transmitting angle.

Here, the second projection component of the blood flow velocity vector at the to-be-measured blood flow position is calculated in a similar manner to the first projection component described above, except that the data used in the calculation is different. Let the third pulse repetition frequency be $f_{PRF3}$ and the fourth pulse repetition frequency be $f_{PRF4}$ for ease of understanding, then the previous formulas (5) to (8) can be transformed into:

$$v_{z-corr} = B_3 + 2Mv_{max3} \quad (9)$$

$$v_{z-corr} = B_4 + 2Nv_{max4} \quad (10)$$

$$B_3 - B_4 = 2(Nv_{max4} - Mv_{max3}) \quad (11)$$

$$\underset{M,N}{\mathrm{argmin}} |(B_3 - B_4) - 2(Nv_{max4} - Mv_{max3})| \quad (12)$$

Hence the third blood flow velocity may be considered as $B_3$ in formula (12), the fourth blood flow velocity may be considered as $B_4$ in formula (12), the third maximum measurable velocity may be considered as $v_{max3}$ in formula (12), the fourth maximum measurable velocity may be considered as $v_{max4}$ in formula (12), the second de-aliasing coefficient may be considered as M and/or N in formula (12), and the second predetermined condition may be understood as making formula (12) valid. M and N in formulas (5) to (8) have the same meaning as M and N in formulas (9) to (12), but different value results may exist based on different data sources; the same letters used for representation here is merely illustrative and do not mean that they are necessarily the same.

Accordingly, the step of determining a second de-aliasing coefficient meeting a second predetermined condition according to the third blood flow velocity, the fourth blood flow velocity, the third maximum measurable velocity and the fourth maximum measurable velocity may comprise: taking a difference value between the third blood flow velocity and the fourth blood flow velocity as a fourth difference value (i.e. $B_3-B_4$); taking twice a difference value between N times the fourth maximum measurable velocity and M times the third maximum measurable velocity as a fifth difference value (i.e. $2(Nv_{max4}-Mv_{max3})$), where N and M are integers; taking a difference value between the fourth difference value and the fifth difference value as a sixth difference value (i.e. $(B_3-B_4)-2(Nv_{max4}-Mv_{max3})$); and calculating to acquire a value result about M and N that minimizes an absolute value of the sixth difference value (i.e. formula (12)), and taking M and/or N in the value result as the second de-aliasing coefficient.

Since the value result of M corresponds to the third blood flow velocity $B_3$, when the value result of M being taken as the second de-aliasing coefficient, the third blood flow velocity is de-aliased based on the second de-aliasing coefficient to acquire the second projection component of blood flow velocity vector at the to-be-measured blood flow position at the second transmitting angle, that is, the second projection component of blood flow velocity vector at the to-be-measured blood flow position at the second transmitting angle may be calculated by the formula (9) mentioned above. Since the value result of N corresponds to the fourth blood flow velocity $B_4$, when the value result of N being taken as the second de-aliasing coefficient, de-aliasing the fourth blood flow velocity based on the second de-aliasing coefficient to acquire the second projection component of blood flow velocity vector at the to-be-measured blood flow position at the second transmitting angle, that is, the second projection component of blood flow velocity vector at the to-be-measured blood flow position at the second transmitting angle may be calculated by the formula (10) mentioned above. Alternatively, the projection component obtained by de-aliasing the third blood flow velocity using M as the second de-aliasing coefficient and the projection component obtained by de-aliasing the fourth blood flow velocity using N as the second de-aliasing coefficient may be averaged, and an averaged result therefrom may be taken as a final second projection component of blood flow velocity vector at the to-be-measured blood flow position at the first transmitting angle.

In an embodiment of the present disclosure, in a case that there are at least two groups of value results about M and N, M and/or N with a minimum absolute value in the value results is taken as the second de-aliasing coefficient when minimizing the absolute value of the sixth difference value.

The first transmitting angle is now used as the example to describe some instances of method 100 according to embodiments of the present disclosure, but it should be understood that the second transmitting angle is also considered to be in a similar situation.

In an example, assuming that the first pulse repetition frequency is 3k (i.e., 3000 Hz) and the second pulse repetition frequency is 4k (i.e., 4000 Hz), when the sound speed c is 1540 m/s and the center frequency of the signal transmitted by the probe is 5 MHz, the maximum measurable velocities (absolute value thereof) corresponding to the first pulse repetition frequency and the second pulse repetition frequency respectively is:

$$v_{max1} = \frac{cf_{PRF}}{4f_0} = \frac{1540 \times 3000}{4 \times 5000000} = 0.231 \, \mathrm{m/s}$$

$$v_{max2} = \frac{cf_{PRF}}{4f_0} = \frac{1540 \times 4000}{4 \times 5000000} = 0.308 \, \mathrm{m/s}$$

The following describes how to obtain the actual velocity by de-aliasing through formula (8) when the measured actual velocity exceeds these two values. For example, if the current actual velocity is v=0.5 m/s, $B_1$ and $B_2$ obtained due to aliasing are:

$$B_1 = 0.5 - 2 \times 0.231 = 0.038 \text{ m/s}$$

$$B_2 = 0.5 - 2 \times 0.308 = -0.116 \text{ m/s}$$

All $B_1$, $B_2$, $v_{max1}$ and $v_{max2}$ are put into formula (8):

$$\underset{M,N}{\mathrm{argmin}}|(0.038 + 0.116) - 2(0.308N - 0.231M)|$$

subject to M, N∈ ℤ

Let |(0.038+0.116)−2(0.308N−0.231M)| be X, and X for different M and N is shown below in Table 1:

TABLE 1

| M | N | X |
|---|---|---|
| 0 | 0 | 0.154 |
| 1 | 0 | 0.616 |
| 1 | 1 | 0 |
| −1 | 0 | −0.308 |
| −1 | −1 | 0.308 |
| −2 | −1 | −0.154 |
| −2 | −2 | 0.462 |
| 2 | 1 | 0.462 |
| 2 | 2 | −0.154 |
| 3 | 2 | 0.308 |
| 3 | 3 | −0.308 |
| 4 | 3 | 0.154 |
| 4 | 4 | −0.462 |
| 5 | 4 | 0 |
| 5 | 5 | −0.616 |
| 6 | 5 | −0.154 |
| 6 | 6 | 0.77 |

As can be seen from the values in Table 1, the minimum X can be obtained when M and N are both 1 and M=5 and N=4. M with relatively small absolute value is taken, and M=1 is put into formula (3) to get the final value:

$$v_{z-corr} = -\frac{cf_{PRF1}}{4\pi f_0}\arctan(A_1) + 2Mv_{max1} =$$

$$B_1 + 2Mv_{max1} = 0.038 + 2 \times 0.231 = 0.5 \text{ m/s}$$

It can be readily seen that the measured velocity value of the method is the same as the actual velocity value, which proves that the projection component of the blood flow velocity at a certain transmitting angle can be measured accurately by means of the method according to the present disclosure, further measuring the blood flow velocity vector accurately.

In another example, assuming that the first pulse repetition frequency is 2k (i.e., 2000 Hz) and the second pulse repetition frequency is 9k (i.e., 9000 Hz), when the sound speed c is 1540 m/s and the center frequency of the signal transmitted by the probe is 4 MHz, the maximum measurable velocities (absolute value thereof) corresponding to the first pulse repetition frequency and the second pulse repetition frequency respectively is:

$$v_{max1} = \frac{cf_{PRF}}{4f_0} = \frac{1540 \times 2000}{4 \times 4000000} = 0.1925 \text{ m/s}$$

$$v_{max2} = \frac{cf_{PRF}}{4f_0} = \frac{1540 \times 9000}{4 \times 4000000} = 0.86625 \text{ m/s}$$

The following describes how to obtain the actual velocity by de-aliasing through formula (8) when the measured actual velocity exceeds these two values. For example, if the current actual velocity is v=−1 m/s, $B_1$ and $B_2$ obtained due to aliasing are:

$$B_1 = -1 + 3 \times 2 \times 0.1925 = 0.155 \text{ m/s}$$

$$B_2 = -1 + 2 \times 0.86625 = 0.7325 \text{ m/s}$$

All $B_1$, $B_2$, $v_{max1}$ and $v_{max2}$ are put into formula (8):

$$\underset{M,N}{\mathrm{argmin}}|(0.155 - 0.7325) - 2(0.86625N - 0.1925M)|$$

subject to M, N∈ ℤ

Let |(0.155−0.7324)−(0.8662N−0.1925M)| be X, and X for different M and N is shown below in Table 2:

TABLE 2

| M | N | X |
|---|---|---|
| 0 | 0 | −0.5775 |
| 1 | 0 | −0.1925 |
| 1 | 1 | −1.925 |
| 2 | 1 | −1.54 |
| 2 | 0 | 0.1925 |
| 3 | 0 | 0.5775 |
| 3 | 1 | −1.155 |
| 4 | 1 | −0.77 |
| 6 | 1 | 0 |
| −1 | 0 | −0.9625 |
| −1 | −1 | 0.77 |
| −2 | 0 | −1.3475 |
| −3 | −1 | 0 |
| −3 | 0 | −1.7325 |
| −4 | −1 | −0.385 |
| −4 | −2 | 1.3475 |
| −5 | −3 | 2.695 |
| −12 | −3 | 0 |

As can be seen from the values in Table 2, the minimum X can be obtained when M=6 and N=1, or M=−3 and N=−1, or M=−12 and N=−3. M with relatively small absolute value is taken, and M=−3 is put into formula (3) to get the final value:

$$v_{z-corr} = -\frac{cf_{PRF1}}{4\pi f_0}\arctan(A_1) + 2Mv_{max1} =$$

$$B_1 + 2Mv_{max1} = 0.155 - 3 \times 2 \times 0.1925 = -1 \text{ m/s}$$

It can also be readily seen from the example that the measured velocity value of the method is the same as the actual velocity value, which proves that the projection component of the blood flow velocity at a certain transmitting angle can be measured accurately by means of the method according to the present disclosure, further measuring the blood flow velocity vector accurately.

In an example, assuming that the first pulse repetition frequency is 3.5k (i.e., 3500 Hz) and the second pulse repetition frequency is 2k (i.e., 2000 Hz), when the sound speed c is 1540 m/s and the center frequency of the signal transmitted by the probe is 5 MHz, the maximum measurable velocities (absolute value thereof) corresponding to the first pulse repetition frequency and the second pulse repetition frequency respectively is:

$$v_{max1} = \frac{cf_{PRF}}{4f_0} = \frac{1540 \times 3500}{4 \times 5000000} = 0.2695 \text{ m/s}$$

$$v_{max2} = \frac{cf_{PRF}}{4f_0} = \frac{1540 \times 2000}{4 \times 5000000} = 0.154 \text{ m/s}$$

The following describes how to obtain the actual velocity by de-aliasing through formula (8) when the measured actual velocity exceeds these two values. For example, if the current actual velocity is v=1.5 m/s, $B_1$ and $B_2$ obtained due to aliasing are:

$$B_1 = 1.5 - 3 \times 2 \times 0.2695 = -0.117 \text{ m/s}$$

$$B_2 = 1.5 - 5 \times 2 \times 0.154 = -0.04 \text{ m/s}$$

All $B_1$, $B_2$, $v_{max1}$ and $v_{max2}$ are put into formula (8):

$$\underset{M,N}{\text{argmin}} |(-0.117 + 0.04) - 2(0.154N - 0.2695M)|$$

subject to M, N∈ ℤ
Let |(−0.117+0.04)−2(0.154N−0.2695M)| be X, and X for different M and N is shown below in Table 3:

TABLE 3

| M | N | X |
|---|---|---|
| 0 | 0 | −0.077 |
| 0 | 1 | −0.385 |
| 1 | 1 | 0.154 |
| 1 | 2 | −0.154 |
| 2 | 2 | 0.385 |
| 0 | 2 | −0.693 |
| 1 | 3 | −0.462 |
| 2 | 3 | 0.077 |
| 3 | 3 | 0.616 |
| 3 | 4 | 0.308 |
| 3 | 5 | 0 |
| 7 | 12 | 0 |
| −1 | −2 | 0 |
| −5 | −9 | 0 |

As can be seen from the values in Table 3, the minimum X can be obtained when M=3 and N=5, or M=7 and N=12, or M=−1 and N=−2, or M=−5 and N=−9. M with relatively small absolute value is taken, and M=−1 is put into formula (3) to get the final value:

$$v_{z-corr} = -\frac{cf_{PRF1}}{4\pi f_0} \arctan(A_1) + 2Mv_{max1} =$$

$$B_1 + 2Mv_{max1} = -0.117 - 1 \times 2 \times 0.2695 = -0.656 \text{ m/s}$$

In this example, it can be seen that the correct blood flow velocity value is still not obtained with this method due to the excessive actual velocity.

The correct velocity value can only be obtained by putting M=3 into formula (3), namely:

$$v_{z-corr} = -\frac{cf_{PRF1}}{4\pi f_0} \arctan(A_1) + 2Mv_{max1} =$$

$$B_1 + 2Mv_{max1} = -0.117 + 3 \times 2 \times 0.2695 = 1.5 \text{ m/s}$$

However, when the actual velocity is unknown, it is impossible to know which value of M can be put into formula to obtain the actual velocity. This may be a limitation of using the non-uniform PRF to calculate the blood flow velocity in the present disclosure, but the maximum measurable velocity has been improved greatly compared with the traditional method.

The first and second transmitting angles are described in the above examples, but these are only the simplest examples. The present disclosure aims to obtain a velocity component corresponding to each angle (namely, projection component mentioned above) by transmitting at multiple angles (at least two angles), and then to acquire the blood flow velocity vector by vector reconstruction based on these velocity components. In addition, although the first to the third ultrasonic waves are transmitted at the first transmitting angle and the fourth to the sixth ultrasonic waves are transmitted at the second transmitting angle in the above examples, they are only the simplest ones. The number of ultrasonic waves to be transmitted at each transmitting angle is not limited herein, as long as at least three at each transmitting angle are satisfied. In addition, multi-angle transmitting combined with multi-angle receiving (i.e., receiving echoes of ultrasonic waves at one or more receiving angles) can also be adopted to acquire multiple velocity components at different angles, and the blood flow velocity vector can be obtained by vector reconstruction based on these velocity components to be imaged so as to realize vector blood flow imaging.

In an embodiment of the present disclosure, ultrasonic waves can be transmitted alternately by the first transmitting angle and the second transmitting angle. In the embodiment, the transmission sequence of the first ultrasonic waves, the second ultrasonic waves, the third ultrasonic waves, the fourth ultrasonic waves, the fifth ultrasonic waves and the sixth ultrasonic waves may be: the first ultrasonic waves, the fourth ultrasonic waves, the second ultrasonic waves, the fifth ultrasonic waves, the third ultrasonic waves, and the sixth ultrasonic waves. The alternating transmission at two transmitting angles makes the time interval between different angles short and the resultant velocity vector more accurate. In other embodiments, the transmissions may be consecutive at the same transmitting angle. For example, the transmission sequence of the first ultrasonic waves, the second ultrasonic waves, the third ultrasonic waves, the fourth ultrasonic waves, the fifth ultrasonic waves and the sixth ultrasonic waves may be: the first ultrasonic waves, the second ultrasonic waves, the fourth ultrasonic waves, the fifth ultrasonic waves, the third ultrasonic waves and the sixth ultrasonic waves; or the first ultrasonic waves, the second ultrasonic waves, the third ultrasonic waves, the fourth ultrasonic waves, the fifth ultrasonic waves and the sixth ultrasonic waves. In other embodiments, the transmission sequence of the first ultrasonic waves, the second ultrasonic waves, the third ultrasonic waves, the fourth ultrasonic waves, the fifth ultrasonic waves and the sixth ultrasonic waves may also be: the first ultrasonic waves, the fourth ultrasonic waves, the fifth ultrasonic waves, the second ultrasonic waves, the third ultrasonic waves and the sixth ultrasonic waves; or the first ultrasonic waves, the second ultrasonic waves, the fourth ultrasonic waves, the third ultrasonic waves, the fifth ultrasonic waves and the sixth ultrasonic waves; or the first ultrasonic waves, the second ultrasonic waves, the fourth ultrasonic waves, the fifth ultrasonic waves, the sixth ultrasonic waves and the third ultrasonic waves; or the first ultrasonic waves, the fourth ultrasonic waves, the second ultrasonic waves, the third ultrasonic waves, the fifth ultrasonic waves and the sixth ultrasonic waves; or the first ultrasonic waves, the fourth ultrasonic waves, the fifth ultrasonic waves, the sixth ultrasonic waves, the second ultrasonic waves and the third ultrasonic waves; or the first ultrasonic waves, the fourth ultrasonic waves, the second ultrasonic waves, the fifth ultrasonic waves, the fifth ultrasonic waves and the third ultrasonic waves; or the first ultrasonic waves, the fourth ultrasonic waves, the fifth ultrasonic waves, the second ultrasonic waves, the sixth ultrasonic waves and the third ultrasonic waves. This is illustratively described below in conjunction with FIG. 2.

Figure 2:
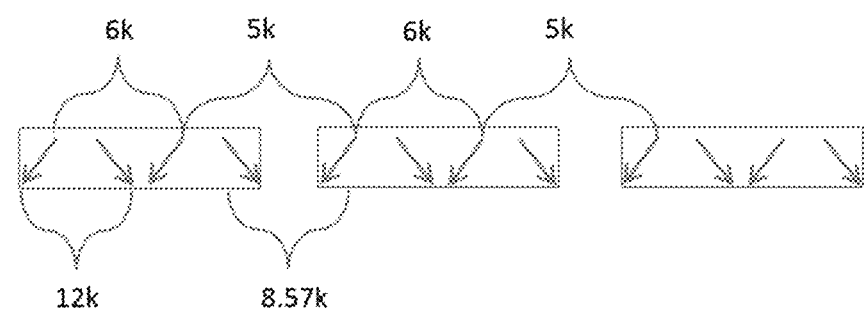
FIG. 2 is an exemplary schematic diagram of transmitting ultrasonic waves in an ultrasonic blood flow imaging method according to an embodiment of the present disclosure.

FIG. 2 shows an exemplary schematic diagram of transmitting ultrasonic waves in an ultrasonic blood flow imaging method according to an embodiment of the present disclosure. As shown in FIG. 2, in the example of FIG. 2, two transmitting angles are taken as an example, where the arrow toward the left is the first transmitting angle, and the arrow toward the right is the second transmitting angle. The two PRFs corresponding to the first transmitting angle are 6k and 5k respectively, and the two PRFs corresponding to the second transmitting angle are also 6k and 5k respectively. In this example, when c is 1540 m/s and the center frequency of the signal transmitted by the probe is 3 MHz, the maximum measurable velocity obtained by traditional methods (when absolute value thereof is taken, PRF=6k) is:

$$v_{max} = \frac{cf_{PRF}}{4f_0} = \frac{1540 \times 6000}{4 \times 3000000} = 0.77 \text{ m/s}$$

By contrast, the maximum measurable velocity acquired by the method of the present disclosure is:

$$v_{max-new} = \frac{cf_{PRF}}{4f_0} = \frac{1540 \times 30000}{4 \times 3000000} = 3.85 \text{ m/s}$$

It is clear that the proposed method herein can improve maximum measurable velocity, wherein the pulse repetition frequency used in obtaining the maximum measurable velocity by the method according to the present disclosure is the least common multiple of both PRFs (i.e., 6k and 5k). As such, the first pulse repetition frequency is non-integer multiple of the second pulse repetition frequency, and the third pulse repetition frequency is non-integer multiple of the fourth pulse repetition frequency, which can improve the maximum measurable velocity. Furthermore, it can also be seen that the maximum measurable velocity under the first transmitting angle can be maximized when both the first pulse repetition frequency and the second pulse repetition frequency are relatively prime to each other. Similarly, the maximum measurable velocity under the second transmitting angle can be maximized when both the third pulse repetition frequency and the fourth pulse repetition frequency are relatively prime to each other.

In an embodiment of the present disclosure, a reciprocal of the maximum of the first pulse repetition frequency, the second pulse repetition frequency, the third pulse repetition frequency and the fourth pulse repetition frequency is greater than twice the ratio of an imaging depth of blood flow to a sound velocity of ultrasonic waves propagating in the to-be-measured blood flow. The reciprocal of each pulse repetition frequency corresponds to the time interval between the transmissions of the two ultrasonic waves. Therefore, the reciprocal of the maximum of the first pulse repetition frequency, the second pulse repetition frequency, the third pulse repetition frequency and the fourth pulse repetition frequency being greater than twice the ratio of an imaging depth of blood flow to a sound velocity of ultrasonic waves propagating in the to-be-measured blood flow may mean that: the minimum transmitting time interval is more than twice the ratio of the imaging depth of blood flow to the sound speed of ultrasonic waves propagating in the to-be-measured blood flow, which can ensure that the ultrasonic waves sent can be received.

In an embodiment of the present disclosure, the first pulse repetition frequency is the same as the third pulse repetition frequency, and the second pulse repetition frequency is the same as the fourth pulse repetition frequency.

For high frame rate vector blood flow imaging, the scanning for blood flow imaging is typically non-focused waves, e.g., plane waves or divergent waves, etc. After such a scan, an entire image can be obtained by beam synthesis and signal processing. However, the image quality of traditional gray scale image should be guaranteed in the process of blood flow imaging. In order to have sufficient spatial resolution for the gray-scale image, it is usually necessary to adopt focused wave emission. In this way, focused waves and unfocused waves are required to alternately transmit for scanning, simultaneously achieving high frame rate flow imaging and high spatial resolution grayscale B-mode imaging.

Based on this, in an embodiment of the present disclosure, the first ultrasonic waves, the second ultrasonic waves, the third ultrasonic waves, the fourth ultrasonic waves, the fifth ultrasonic waves and the sixth ultrasonic waves may all be focused ultrasonic waves, and the method 100 may also include (not shown): transmitting focused ultrasonic waves to the to-be-measured blood flow position, and receiving echoes of the focused ultrasonic waves to acquire focused echo signals; generating a grayscale image of the to-be-measured blood flow position based on the focused echo signals; generating a blood flow velocity vector graph based on the blood flow velocity vector at the to-be-measured blood flow position; and displaying the grayscale image, and displaying the blood flow velocity vector graph superimposed on the grayscale image.

The focused ultrasonic waves may be transmitted between any two adjacent ones of the first ultrasonic waves, the second ultrasonic waves, the third ultrasonic waves, the fourth ultrasonic waves, the fifth ultrasonic waves and the sixth ultrasonic waves. For example, a reciprocal of the minimum of the first pulse repetition frequency, the second pulse repetition frequency, the third pulse repetition frequency and the fourth pulse repetition frequency is a maximum transmission time interval, and the focused ultrasonic waves are transmitted between two ultrasonic waves corresponding to the maximum transmission time interval.

Figure 3:
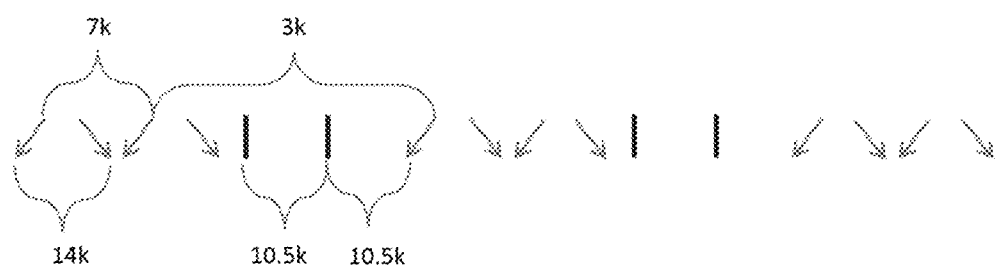
FIG. 3 is an exemplary schematic diagram of transmitting focused ultrasonic waves among non-focused ultrasonic waves in an ultrasonic blood flow imaging method according to an embodiment of the present disclosure.

The alternating scanning of focused and unfocused waves is illustratively described with reference to FIG. 3. As shown in FIG. 3, the non-focused wave which is used for blood flow imaging (oblique line with arrow) has two different transmitting angles, and two different transmitting PRFs, 7k and 3k respectively, correspond to each transmitting angle. Focusing waves are used for gray scale B imaging (vertical lines without arrows). In this example, when the sound speed c is 1540 m/s and the center frequency of the signal transmitted by the probe is 3 MHz, The maximum measurable velocity of traditional methods (when absolute value thereof is taken, PRF=7k) is:

$$v_{max} = \frac{cf_{PRF}}{4f_0} = \frac{1540 \times 7000}{4 \times 3000000} \approx 0.9 \text{ m/s}$$

By contrast, the maximum measurable velocity acquired by the method of the present disclosure is:

$$v_{max-new} = \frac{cf_{PRF}}{4f_0} = \frac{1540 \times 21000}{4 \times 3000000} \approx 2.7 \text{ m/s}$$

At the same time, the scan depth thereof is similar to that in conventional vector flow imaging (at PRF=7k) and is not affected, because the minimum time interval between two adjacent transmissions does not change, both being the reciprocal of 14k.

In an embodiment of the present disclosure, the method 100 may further include: in an echo signal sequence formed by the first echo signals, the second echo signals, the third echo signals, the fourth echo signals, the fifth echo signals and the sixth echo signals, taking echo signals with the same transmitting angle and the same transmission time interval therebetween as a group of signals to acquire at least two groups of echo signals, and wall filtering each group of echo signals respectively, and the wall-filtered echo signals being used to calculate to acquire the first blood flow velocity, the second blood flow velocity, the third blood flow velocity and the fourth blood flow velocity.

Wall filtering is filtering the signal to filter out immobile tissue(s) to obtain signal(s) of moving blood flow. Wall filtering is typically high-pass filtering; and conventional wall filtering includes FIR or IIR filters. However, the input signals of these two filters are generally equidistant signals. The present disclosure adopts non-uniform PRF for transmission, that is, the time intervals of two adjacent transmissions or that of two adjacent transmission at the same angle are different at different times. This is described below in conjunction with FIG. 4 and FIG. 5.

Figure 4:
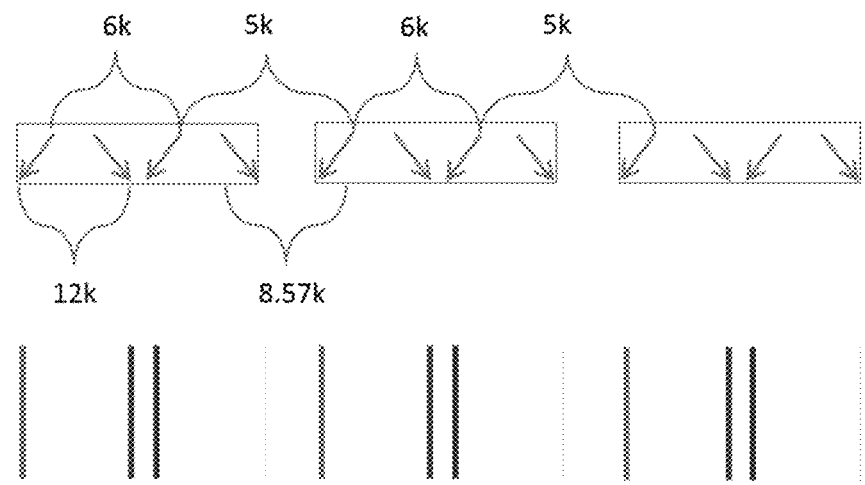
FIG. 4 is an exemplary diagram of grouping transmitted ultrasonic waves for wall filtering their respective echo signals in an ultrasonic blood flow imaging method according to an embodiment of the present disclosure.

FIG. 4 shows an example diagram of grouping transmitted ultrasonic waves for wall filtering of their respective echo signals according to the ultrasonic blood flow imaging method in an embodiment of the disclosure. As shown in the upper graph of FIG. 4, two PRFs, 6k and 5k respectively, are adopted by two transmitting angles, and the time intervals of two adjacent transmissions or that of two adjacent transmission at the same angle are different at different times. Therefore, the wall filtering will be carried out in the following manner to ensure normal use thereof: taking echo signals with the same transmitting angle and the same transmission time interval therebetween as a group of signals to acquire at least two groups of echo signals, and wall filtering each group of echo signals respectively. As shown in the lower graph of FIG. 4, different groups of signals are distinguished by different colors, and signals of the same color (i.e., echo signals having the same transmitting angle and having the same transmission time interval between each other) are wall filtered as a group of signals.

Figure 5:
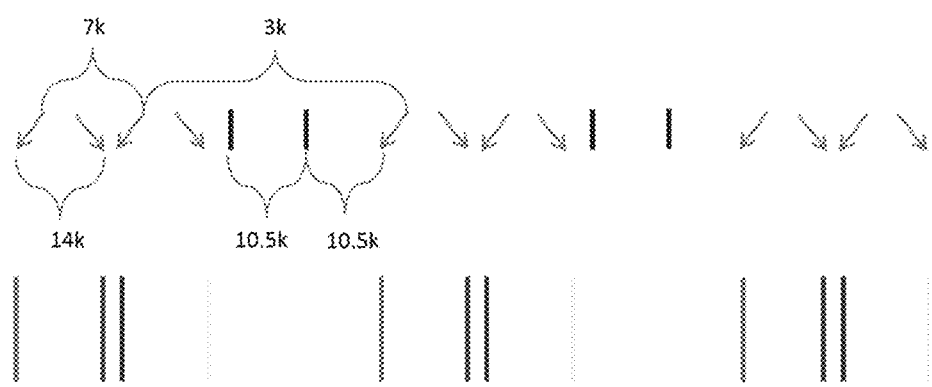
FIG. 5 is another exemplary diagram of grouping transmitted ultrasonic waves for wall filtering their respective echo signals in an ultrasonic blood flow imaging method according to an embodiment of the present disclosure.

FIG. 5 shows another example diagram of grouping transmitted ultrasonic waves for wall filtering of their respective echo signals according to the ultrasonic blood flow imaging method in an embodiment of the disclosure. As shown in the upper graph of FIG. 5, two PRFs, 7k and 3k respectively, are adopted by two transmitting angles, and focused waves for gray-scale imaging are also transmitted during the non-focused wave transmission interval. Similarly, to the example in FIG. 4, the time intervals of two adjacent transmissions or that of two adjacent transmission at the same angle are different at different times. Therefore, the wall filtering will be carried out in the following manner to ensure normal use thereof: taking echo signals with the same transmitting angle and the same transmission time interval therebetween as a group of signals to acquire at least two groups of echo signals, and wall filtering each group of echo signals respectively. As shown in the lower graph of FIG. 5, different groups of signals are distinguished by different colors, and signals of the same color (i.e., echo signals having the same transmitting angle and having the same transmission time interval between each other) are wall filtered as a group of signals.

Figure 6:
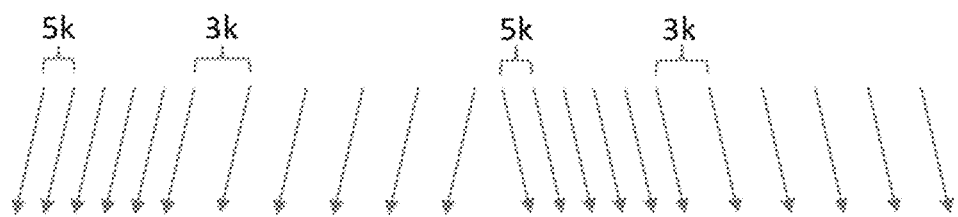
FIG. 6 is an exemplary schematic diagram of continuously transmitted multiple times at the same angle and the same PRF in an ultrasonic blood flow imaging method according to an embodiment of the present disclosure.

In FIG. 2 to FIG. 5, only one transmission of ultrasonic waves with the same PRF at the same transmitting angle is taken as an example for illustration; however, the number of transmission is not limited. Ultrasonic waves with the same PRF under the same transmitting angle may also be transmitted continuously multiple times. For example, at least one of the first to the sixth ultrasonic waves may be transmitted continuously a plurality of times, that is, the ultrasonic waves with the same PRF under the same transmitting angle. As shown in FIG. 6, it is a case that the ultrasonic waves with the same PRF transmitted continuously for six times under the same transmitting angle.

In an embodiment of the present disclosure, a three-dimensional velocity vector may also be calculated. The method 100 may further include: transmitting seventh ultrasonic waves, eighth ultrasonic waves and ninth ultrasonic waves to the to-be-measured blood flow position at a third transmitting angle different from the first transmitting angle and the second transmitting angle and receiving echoes of the ultrasonic waves so as to acquire seventh echo signals, eighth echo signals and ninth echo signals, with a fifth pulse repetition frequency between the seventh ultrasonic waves and the eighth ultrasonic waves and a sixth pulse repetition frequency between the eighth ultrasonic waves and the ninth ultrasonic waves, and the fifth pulse repetition frequency being a non-integer multiple of the sixth pulse repetition frequency; and acquiring a third projection component of the blood flow velocity vector at the to-be-measured blood flow position at the third transmitting angle according to the seventh echo signals, the eighth echo signals, the ninth echo signals, the fifth pulse repetition frequency and the sixth pulse repetition frequency. The step of combining the first projection component and the second projection component to acquire the blood flow velocity vector at the to-be-measured blood flow position may comprise: combining the first projection component, the second projection component and the third projection component to acquire a three-dimensional blood flow velocity vector at the to-be-measured blood flow position. This embodiment adds another transmitting angle on the basis of the method 100, and the description thereof can be understood with reference to the aforementioned steps S110-S150, which will not be repeated here.

The above exemplifies an ultrasonic blood flow imaging method 100 according to an embodiment of the present disclosure. Based on the above description, in the ultrasonic blood flow imaging method 100 according to an embodiment of the present disclosure, ultrasonic waves are transmitted to the to-be-measured blood flow position of the target object at at least two transmitting angles, with non-uniform PRFs to transmit the ultrasonic waves for each transmitting angle, enabling a larger actual PRF, thereby improving the maximum measurable velocity, further enhancing the measurement accuracy of the blood flow velocity vector at the to-be-measured blood flow position.

Figure 7:
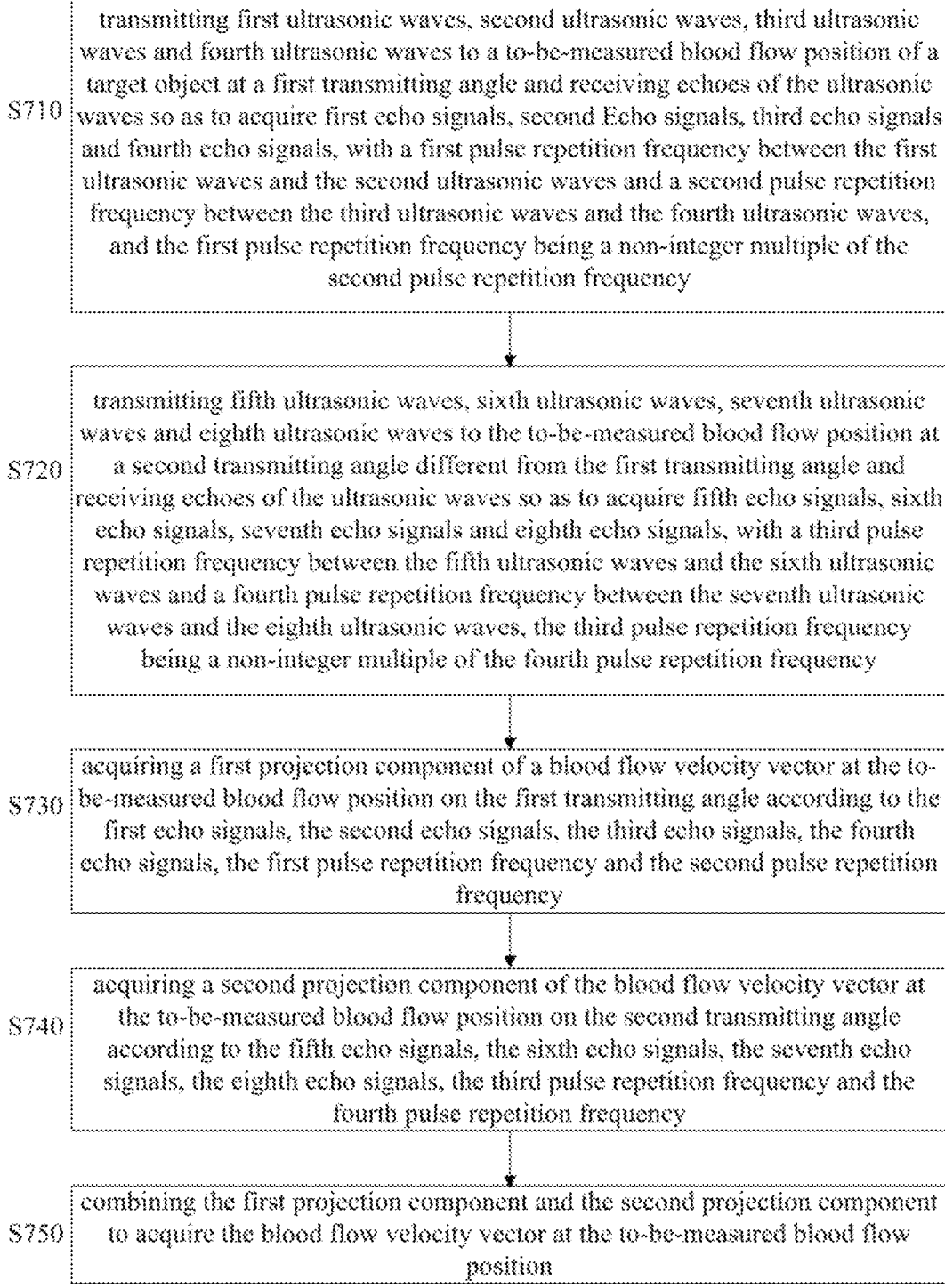
FIG. 7 is a schematic flowchart of an ultrasonic blood flow imaging method according to another embodiment of the present disclosure.

FIG. 7 shows a schematic flowchart of an ultrasonic blood flow imaging method 700 according to another embodiment of the present disclosure. As shown in FIG. 7, the ultrasonic blood flow imaging method 700 may include the following steps:

Step S710: transmitting first ultrasonic waves, second ultrasonic waves, third ultrasonic waves and fourth ultrasonic waves to a to-be-measured blood flow position of a target object at a first transmitting angle and receiving echoes of the ultrasonic waves so as to acquire first echo signals, second echo signals, third echo signals and fourth echo signals, with a first pulse repetition frequency between the first ultrasonic waves and the second ultrasonic waves and a second pulse repetition frequency between the third ultrasonic waves and the fourth ultrasonic waves, and the first pulse repetition frequency being a non-integer multiple of the second pulse repetition frequency;

Step S720: transmitting fifth ultrasonic waves, sixth ultrasonic waves, seventh ultrasonic waves and eighth ultrasonic waves to the to-be-measured blood flow position at a second transmitting angle different from the first transmitting angle and receiving echoes of the ultrasonic waves so as to acquire fifth echo signals, sixth echo signals, seventh echo signals and eighth echo signals, with a third pulse repetition frequency between the fifth ultrasonic waves and the sixth ultrasonic waves and a fourth pulse repetition frequency between the seventh ultrasonic waves and the eighth ultrasonic waves, the third pulse repetition frequency being a non-integer multiple of the fourth pulse repetition frequency;

Step S730: acquiring a first projection component of a blood flow velocity vector at the to-be-measured blood flow position at the first transmitting angle according to the first echo signals, the second echo signals, the third echo signals, the fourth echo signals, the first pulse repetition frequency and the second pulse repetition frequency;

Step S740: acquiring a second projection component of the blood flow velocity vector at the to-be-measured blood flow position at the second transmitting angle according to the fifth echo signals, the sixth echo signals, the seventh echo signals, the eighth echo signals, the third pulse repetition frequency and the fourth pulse repetition frequency; and Step S750: combining the first projection component and the second projection component to acquire the blood flow velocity vector at the to-be-measured blood flow position.

The ultrasonic blood flow imaging method 700 according to an embodiment of the present disclosure is substantially similar to the previously described ultrasonic blood flow imaging method 100, except that: all two adjacent ultrasonic waves under the same transmitting angle are controlled with two different PRFs in the ultrasonic blood flow imaging method 100 (that is, a first PRF is between the first ultrasonic waves and the second ultrasonic waves, and a second PRF is between the second ultrasonic waves and the third ultrasonic waves); in contrast, partially adjacent two ultrasonic waves under the same transmitting angle with two different PRFs are transmitted in the ultrasonic blood flow imaging method 700 (that is, a first PRF is between the first ultrasonic waves and the second ultrasonic waves, a second PRF is between the third ultrasonic waves and the fourth ultrasonic waves, and a PRF between the second ultrasonic waves and the third ultrasonic waves is not limited). Based on this, the ultrasonic echo signals may be multiplexed when calculating the blood flow velocity in the ultrasonic blood flow imaging method 100 (that is, the first blood flow velocity is obtained based on the first echo signals and the second echo signals, the second blood flow velocity is obtained based on the second echo signals and the third echo signals, namely, multiplexing the second echo signals), while there is unnecessary to multiplex the ultrasonic echo signals when calculating the blood flow velocity in the ultrasonic blood flow imaging method 700 (that is, the first blood flow velocity is obtained based on the first echo signals and the second echo signals, and the second blood flow velocity is based on the third echo signals and the fourth echo signals). For the sake of brevity, the similarities between the two methods will not be described in detail herein, and the details of the ultrasonic blood flow imaging method 700 may be understood in conjunction with the foregoing description, which will only briefly describe the main operations thereof.

In an embodiment of the present disclosure, the step S730 of acquiring a first projection component of a blood flow velocity vector at the to-be-measured blood flow position at the first transmitting angle according to the first echo signals, the second echo signals, the third echo signals, the fourth echo signals, the first pulse repetition frequency and the second pulse repetition frequency may comprise: acquiring a first blood flow velocity according to the first echo signals and the second echo signals, and acquiring a second blood flow velocity according to the third echo signals and the fourth echo signals; acquiring a first maximum measurable velocity corresponding to the first pulse repetition frequency and a second maximum measurable velocity corresponding to the second pulse repetition frequency; determining a first de-aliasing coefficient meeting a first predetermined condition according to the first blood flow velocity, the second blood flow velocity, the first maximum measurable velocity and the second maximum measurable velocity; and de-aliasing the first blood flow velocity and/or the second blood flow velocity based on the first de-aliasing coefficient to acquire the first projection component of the blood flow velocity vector at the to-be-measured blood flow position at the first transmitting angle.

The step of determining a first de-aliasing coefficient meeting a first predetermined condition according to the first blood flow velocity, the second blood flow velocity, the first maximum measurable velocity and the second maximum measurable velocity may comprise: taking a difference value between the first blood flow velocity and the second blood flow velocity as a first difference value; taking twice a difference value between N times the second maximum measurable velocity and M times the first maximum measurable velocity as a second difference value, where N and M are integers; taking a difference value between the first difference value and the second difference value as a third difference value; and calculating to acquire a value result about M and N that minimizes an absolute value of the third difference value, and taking M and/or N in the value result as the first de-aliasing coefficient; wherein when the value result of M being taken as the first de-aliasing coefficient, the first blood flow velocity is de-aliased based on the first de-aliasing coefficient to acquire the first projection component of blood flow velocity vector at the to-be-measured blood flow position at the first transmitting angle; and when the value result of N being taken as the first de-aliasing coefficient, the second blood flow velocity is de-aliased based on the first de-aliasing coefficient to acquire the first projection component of blood flow velocity vector at the to-be-measured blood flow position at the first transmitting angle. Alternatively, the projection component obtained by de-aliasing the first blood flow velocity using M as the first de-aliasing coefficient and the projection component obtained by de-aliasing the first blood flow velocity using N as the first de-aliasing coefficient may be averaged, and an averaged result therefrom may be taken as a final first projection component of blood flow velocity vector at the to-be-measured blood flow position at the first transmitting angle.

In a case that there are at least two groups of value results about M and N, M and/or N with a minimum absolute value in the value results may be taken as the first de-aliasing coefficient when minimizing the absolute value of the third difference value.

In an embodiment of the present disclosure, the step S740 of acquiring a second projection component of the blood flow velocity vector at the to-be-measured blood flow position at the second transmitting angle according to the fifth echo signals, the sixth echo signals, the seventh echo signals, the eighth echo signals, the third pulse repetition frequency and the fourth pulse repetition frequency may include: acquiring a third blood flow velocity according to the fifth echo signals and the sixth echo signals, and acquiring a fourth blood flow velocity according to the seventh echo signals and the eighth echo signals; acquiring a third maximum measurable velocity corresponding to the third pulse repetition frequency and a fourth maximum measurable velocity corresponding to the fourth pulse repetition frequency; determining a second de-aliasing coefficient meeting a second predetermined condition according to the third blood flow velocity, the fourth blood flow velocity, the third maximum measurable velocity and the fourth maximum measurable velocity; and de-aliasing the third blood flow velocity and/or the fourth blood flow velocity based on the second de-aliasing coefficient to acquire the second projection component of the blood flow velocity vector at the to-be-measured blood flow position at the second transmitting angle.

The step of determining a second de-aliasing coefficient meeting a second predetermined condition according to the third blood flow velocity, the fourth blood flow velocity, the third maximum measurable velocity and the fourth maximum measurable velocity may comprise: taking a difference value between the third blood flow velocity and the fourth blood flow velocity as a fourth difference value; taking twice a difference value between N times the third maximum measurable velocity and M times the fourth maximum measurable velocity as a fifth difference value, where N and M are integers; taking a difference value between the fourth difference value and the fifth difference value as a sixth difference value; and calculating to acquire a value result about M and N that minimizes an absolute value of the sixth difference value, and taking M and/or N in the value result as the second de-aliasing coefficient. When the value result of M being taken as the second de-aliasing coefficient, the third blood flow velocity is de-aliased based on the second de-aliasing coefficient to acquire the second projection component of blood flow velocity vector at the to-be-measured blood flow position at the second transmitting angle; and when the value result of N being taken as the second de-aliasing coefficient, the fourth blood flow velocity is de-aliased based on the second de-aliasing coefficient to acquire the second projection component of blood flow velocity vector at the to-be-measured blood flow position at the second transmitting angle. Alternatively, the projection component obtained by de-aliasing the third blood flow velocity using M as the second de-aliasing coefficient and the projection component obtained by de-aliasing the fourth blood flow velocity using N as the second de-aliasing coefficient may be averaged, and an averaged result therefrom may be taken as a final second projection component of blood flow velocity vector at the to-be-measured blood flow position at the second transmitting angle.

In a case that there are at least two groups of value results about M and N, M and/or N with a minimum absolute value in the value results may be taken as the second de-aliasing coefficient when minimizing the absolute value of the sixth difference value.

In an embodiment of the present disclosure, the transmission sequence of the first ultrasonic waves, the second ultrasonic waves, the third ultrasonic waves, the fourth ultrasonic waves, the fifth ultrasonic waves, the sixth ultrasonic waves, the seventh ultrasonic waves and the eighth ultrasonic waves may be: the first ultrasonic waves, the fifth ultrasonic waves, the second ultrasonic waves, the sixth ultrasonic waves, the third ultrasonic waves, the seventh ultrasonic waves, the fourth ultrasonic waves and the eighth ultrasonic waves; or the first ultrasonic waves, the second ultrasonic waves, the fifth ultrasonic waves, the sixth ultrasonic waves, the third ultrasonic waves, the fourth ultrasonic waves, the seventh ultrasonic waves and the eighth ultrasonic waves; or the first ultrasonic waves, the second ultrasonic waves, the third ultrasonic waves, the fifth ultrasonic waves, the sixth ultrasonic waves, the seventh ultrasonic waves, the fourth ultrasonic waves and the eighth ultrasonic waves; or the first ultrasonic waves, the second ultrasonic waves, the third ultrasonic waves, the fourth ultrasonic waves, the fifth ultrasonic waves, the sixth ultrasonic waves, the seventh ultrasonic waves and the eighth ultrasonic waves. Similarly, with reference to the description of the alternating scanning sequence in the foregoing embodiments, the transmission sequence of the first to the eighth ultrasonic waved in the embodiments of the present disclosure is not limited to the above-listed ones. It only needs to achieve the alternating effect, and are not exhaustive herein.

In an embodiment of the present disclosure, both the first pulse repetition frequency and the second pulse repetition frequency are relatively prime to each other, and both the third pulse repetition frequency and the fourth pulse repetition frequency are relatively prime to each other.

In an embodiment of the present disclosure, a reciprocal of the maximum of the first pulse repetition frequency, the second pulse repetition frequency, the third pulse repetition frequency and the fourth pulse repetition frequency is greater than twice the ratio of an imaging depth of blood flow to a sound velocity of ultrasonic waves propagating in the to-be-measured blood flow.

In an embodiment of the present disclosure, the first pulse repetition frequency is the same as the third pulse repetition frequency, and the second pulse repetition frequency is the same as the fourth pulse repetition frequency.

In an embodiment of the present disclosure, the step of receiving echoes of the ultrasonic waves comprises: receiving echoes of the ultrasonic waves at one or more receiving angles.

In an embodiment of the present disclosure, all the first ultrasonic waves, the second ultrasonic waves, the third ultrasonic waves, the fourth ultrasonic waves, the fifth ultrasonic waves, the sixth ultrasonic waves, the seventh ultrasonic waves and the eighth ultrasonic waves are non-focused ultrasonic waves; and the method 700 may further include (not shown): transmitting focused ultrasonic waves to the to-be-measured blood flow position, and receiving echoes of the focused ultrasonic waves to acquire focused echo signals; generating a grayscale image of the to-be-measured blood flow position based on the focused echo signals; generating a blood flow velocity vector graph based on the blood flow velocity vector at the to-be-measured blood flow position; and displaying the grayscale image, and displaying the blood flow velocity vector graph superimposed on the grayscale image.

In an embodiment of the present disclosure, the focused ultrasonic waves are transmitted between any two adjacent ones of the first ultrasonic waves, the second ultrasonic waves, the third ultrasonic waves, the fourth ultrasonic waves, the fifth ultrasonic waves, the sixth ultrasonic waves, the seventh ultrasonic waves and the eighth ultrasonic waves.

In an embodiment of the present disclosure, a reciprocal of the minimum of the first pulse repetition frequency, the second pulse repetition frequency, the third pulse repetition frequency and the fourth pulse repetition frequency is a maximum transmission time interval, and the focused ultrasonic waves are transmitted between two ultrasonic waves corresponding to the maximum transmission time interval.

In an embodiment of the present disclosure, the method 700 may further include (not shown): in an echo signal sequence formed by the first echo signals, the second echo signals, the third echo signals, the fourth echo signals, the fifth echo signals, the sixth echo signals, the seventh echo signals and the eighth echo signals, taking echo signals with the same transmitting angle and the same transmission time interval therebetween as a group of signals to acquire at least two groups of echo signals, and wall filtering each group of echo signals respectively, and the wall-filtered echo signals being used to calculate to acquire the first blood flow velocity, the second blood flow velocity, the third blood flow velocity and the fourth blood flow velocity.

In an embodiment of the present disclosure, a three-dimensional velocity component may also be calculated. The method 700 may further include: transmitting ninth ultrasonic waves, tenth ultrasonic waves, eleventh ultrasonic waves and twelfth ultrasonic waves to the to-be-measured blood flow position at a third transmitting angle different from the first transmitting angle and the second transmitting angle and receiving echoes of the ultrasonic waves so as to acquire ninth echo signals, tenth echo signals, eleventh echo signals and twelfth echo signals, with a fifth pulse repetition frequency between the ninth ultrasonic waves and the tenth ultrasonic waves and a sixth pulse repetition frequency between the eleventh ultrasonic waves and the twelfth ultrasonic waves, and the fifth pulse repetition frequency being a non-integer multiple of the sixth pulse repetition frequency; and acquiring a third projection component of the blood flow velocity vector at the to-be-measured blood flow position at the third transmitting angle according to the ninth echo signals, the tenth echo signals, the eleventh echo signals, the twelfth echo signals, the fifth pulse repetition frequency and the sixth pulse repetition frequency. The step of combining the first projection component and the second projection component to acquire the blood flow velocity vector at the to-be-measured blood flow position may comprise: combining the first projection component, the second projection component and the third projection component to acquire a three-dimensional blood flow velocity vector at the to-be-measured blood flow position. This embodiment adds another transmitting angle on the basis of the method 700, and the description thereof can be understood with reference to the aforementioned steps S710-S750, which will not be repeated here.

Further, the method 100 and the method 700 may be used in combination. In an embodiment of the present disclosure, the ultrasonic blood flow imaging may include: transmitting first ultrasonic waves, second ultrasonic waves and third ultrasonic waves to a to-be-measured blood flow position of a target object at a first transmitting angle and receiving echoes of the ultrasonic waves so as to acquire first echo signals, second echo signals and third echo signals, with a first pulse repetition frequency between the first ultrasonic waves and the second ultrasonic waves and a second pulse repetition frequency between the second ultrasonic waves and the third ultrasonic waves, and the first pulse repetition frequency being a non-integer multiple of the second pulse repetition frequency; transmitting fourth ultrasonic waves, fifth ultrasonic waves, sixth ultrasonic waves and seventh ultrasonic waves to the to-be-measured blood flow position at a second transmitting angle different from the first transmitting angle and receiving echoes of the ultrasonic waves so as to acquire fourth echo signals, fifth echo signals, sixth echo signals and seventh echo signals, with a third pulse repetition frequency between the fourth ultrasonic waves and the fifth ultrasonic waves and a fourth pulse repetition frequency between the sixth ultrasonic waves and the seventh ultrasonic waves, and the third pulse repetition frequency being a non-integer multiple of the fourth pulse repetition frequency; acquiring a first projection component of a blood flow velocity vector at the to-be-measured blood flow position at the first transmitting angle according to the first echo signals, the second echo signals, the third echo signals, the first pulse repetition frequency and the second pulse repetition frequency; acquiring a second projection component of the blood flow velocity vector at the to-be-measured blood flow position at the second transmitting angle according to the fourth echo signals, the fifth echo signals, the sixth echo signals, the seventh echo signals, the third pulse repetition frequency and the fourth pulse repetition frequency; and combining the first projection component and the second projection component to acquire the blood flow velocity vector at the to-be-measured blood flow position.

The first transmitting angle in the ultrasonic blood flow imaging method according to an embodiment of the present disclosure uses a scheme corresponding to the first transmitting angle in the ultrasonic blood flow imaging method 100 described above, and the second transmitting angle uses a scheme corresponding to the second transmitting angle in the ultrasonic blood flow imaging method 700 described above. The description may be understood with reference to the foregoing description of method 100 and method 700 and is not repeated here.

Figure 8:
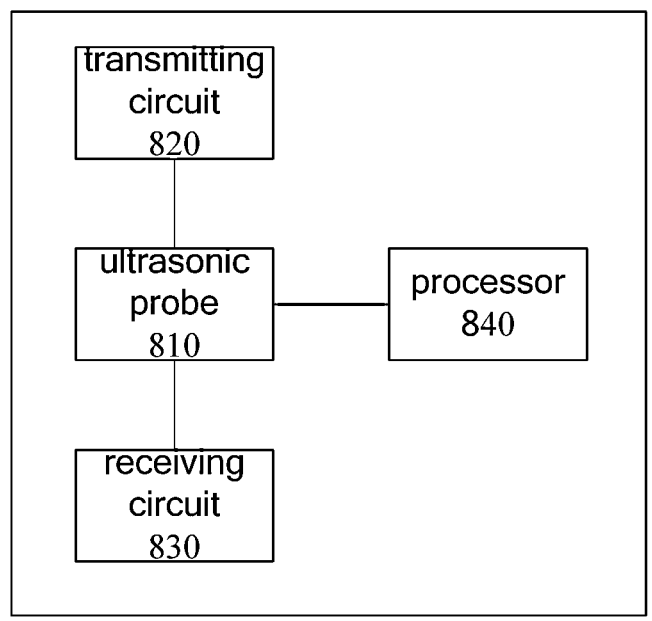
FIG. 8 is a schematic block diagram of an ultrasonic imaging apparatus according to an embodiment of the present disclosure.

FIG. 8 illustrates an ultrasonic imaging apparatus 800 according to an embodiment of the present disclosure. As shown in FIG. 8, the ultrasonic imaging apparatus may include an ultrasonic probe 810, a transmitting circuit 820, a receiving circuit 830 and a processor 840. The transmitting circuit 820 may be configured to control the ultrasonic probe 810 to transmit ultrasonic waves to the to-be-measured blood flow position of the target object. The receiving circuit 830 may be configured to control the ultrasonic probe 810 to receive echoes of the ultrasonic waves and acquire echo signals from the echoes of ultrasonic waves. The processor 840 may be configured to perform ultrasonic blood flow imaging based on the echo signals, and further be configured to perform the ultrasonic blood flow imaging method 100 or 700 mentioned above. The structure and operation of ultrasonic imaging apparatus 800 can be understood in combination with the above, and will not be repeated here for the sake of brevity.

Based on the above description, in the ultrasonic blood flow imaging methods and the ultrasonic imaging apparatus according to the embodiments of the present disclosure, ultrasonic waves are transmitted to the to-be-measured blood flow position of the target object at at least two transmitting angles, with a non-uniform PRF adopted to transmit ultrasonic waves at each transmitting angle, so that a larger actual PRF can be achieved, thereby improving the maximum measurable velocity and thus the measurement accuracy of the to-be-measured blood flow position blood flow velocity vector.

While exemplary embodiments have been described herein with reference to the accompanying drawings, it should be understood that the above example embodiments are merely illustrative and are not intended to limit the scope of the disclosure thereto. Those skilled in the art may make various changes and modifications therein without departing from the scope and spirit of the disclosure. All such changes and modifications are intended to be included in the scope of the disclosure as claimed in the appended claims.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. Those skilled in the art could use different methods to implement the described functions for each particular application, but such implementation should not be considered to be beyond the scope of the disclosure.

In several embodiments provided in the present disclosure, it should be understood that the disclosed devices and methods may be implemented in other ways. For example, the device embodiments described above are merely exemplary. For example, the division of units is merely a logical function division. In actual implementations, there may be other division methods. For example, a plurality of units or components may be combined or integrated into another device, or some features may be omitted or not implemented.

A large number of specific details are explained in this specification provided herein. However, it can be understood that the embodiments of the disclosure can be practiced without these specific details. In some instances, well-known methods, structures, and technologies are not shown in detail, so as not to obscure the understanding of this description.

Similarly, it should be understood that in order to simplify the disclosure and help to understand one or more of various aspects of the disclosure, in the description of the exemplary embodiments of the disclosure, various features of the disclosure are sometimes together grouped into an individual embodiment, figure or description thereof. However, the method of the disclosure should not be construed as reflecting the following intention, namely, the disclosure set forth requires more features than those explicitly stated in each claim. More precisely, as reflected by the corresponding claims, the inventive point thereof lies in that features that are fewer than all the features of an individual embodiment disclosed may be used to solve the corresponding technical problem. Therefore, the claims in accordance with the particular embodiments are thereby explicitly incorporated into the particular embodiments, wherein each claim itself serves as an individual embodiment of the disclosure.

Those skilled in the art should understand that, in addition to the case where features are mutually exclusive, any combination may be used to combine all the features disclosed in this specification (along with the appended claims, abstract, and drawings) and all the processes or units of any of methods or devices as disclosed. Unless explicitly stated otherwise, each feature disclosed in this specification (along with the appended claims, abstract, and drawings) may be replaced by an alternative feature that provides the same, equivalent, or similar object.

Furthermore, those skilled in the art should understand that although some of the embodiments described herein comprise some but not other features included in other embodiments, combinations of features of different embodiments are meant to be within the scope of the disclosure, and form different embodiments. For example, in the claims, any one of the embodiments set forth thereby can be used in any combination.

Various embodiments regarding components in the disclosure may be implemented in hardware, or implemented by software modules running on one or more processors, or implemented in a combination thereof. It should be understood for those skilled in the art that a microprocessor or a digital signal processor (DSP) may be used in practice to implement some or all of the functions of some modules according to the embodiments of the disclosure. The disclosure may further be implemented as an apparatus program (e.g., a computer program and a computer program product) for executing some or all of the methods described herein. Such a program for implementing the disclosure may be stored on a computer-readable medium, or may be in the form of one or more signals. Such a signal may be downloaded from an Internet website, or provided on a carrier signal, or provided in any other form.

It should be noted that the description of the disclosure made in the above-mentioned embodiments is not to limit the disclosure, and those skilled in the art may design alternative embodiments without departing from the scope of the appended claims. In the claims, any reference signs placed between parentheses should not be construed as limitation on the claims. The word "includes" does not preclude the existence of elements or steps not listed in the claims. The word "a" or "an" preceding an element does not preclude the existence of more than one such element. The disclosure may be implemented by means of hardware comprising several different elements and by means of an appropriately programmed computer. In unit claims listing several ultrasound imaging apparatus, several of these ultrasound imaging apparatus may be specifically embodied by one and the same item of hardware. The use of the terms "first", "second", "third", etc. does not indicate any order. These terms may be interpreted as names.

The above is only the specific embodiment of the present disclosure or the description of the specific embodiment, and the protection scope of the present disclosure is not limited thereto. Any changes or substitutions should be included within the protection scope of the present disclosure. The protection scope of the present disclosure shall be subject to the protection scope of the claims.

The invention claimed is:

1. An ultrasonic blood flow imaging method, comprising:
transmitting first ultrasonic waves, second ultrasonic waves and third ultrasonic waves to a to-be-measured blood flow position of a target object at a first transmitting angle and receiving echoes of the first, second, and third ultrasonic waves so as to acquire first echo signals, second echo signals and third echo signals, with a first pulse repetition frequency between the first ultrasonic waves and the second ultrasonic waves and a second pulse repetition frequency between the second ultrasonic waves and the third ultrasonic waves, and the first pulse repetition frequency being a non-integer multiple of the second pulse repetition frequency;
transmitting fourth ultrasonic waves, fifth ultrasonic waves and sixth ultrasonic waves to the to-be-measured blood flow position at a second transmitting angle different from the first transmitting angle and receiving echoes of the fourth, fifth, and sixth ultrasonic waves so as to acquire fourth echo signals, fifth echo signals and sixth echo signals, with a third pulse repetition frequency between the fourth ultrasonic waves and the fifth ultrasonic waves and a fourth pulse repetition frequency between the fifth ultrasonic waves and the sixth ultrasonic waves, and the third pulse repetition frequency being a non-integer multiple of the fourth pulse repetition frequency;
acquiring a first projection component of a blood flow velocity vector at the to-be-measured blood flow position at the first transmitting angle according to the first echo signals, the second echo signals, the third echo signals, the first pulse repetition frequency and the second pulse repetition frequency;
acquiring a second projection component of the blood flow velocity vector at the to-be-measured blood flow position at the second transmitting angle according to the fourth echo signals, the fifth echo signals, the sixth echo signals, the third pulse repetition frequency and the fourth pulse repetition frequency; and
combining the first projection component and the second projection component to acquire the blood flow velocity vector at the to-be-measured blood flow position.

2. The method according to claim 1, wherein the acquiring the first projection component of the blood flow velocity vector at the to-be-measured blood flow position at the first transmitting angle according to the first echo signals, the second echo signals, the third echo signals, the first pulse repetition frequency and the second pulse repetition frequency comprises:
acquiring a first blood flow velocity according to the first echo signals and the second echo signals, and acquiring a second blood flow velocity according to the second echo signals and the third echo signals;
acquiring a first maximum measurable velocity corresponding to the first pulse repetition frequency and a second maximum measurable velocity corresponding to the second pulse repetition frequency;
determining a first de-aliasing coefficient meeting a first predetermined condition according to the first blood flow velocity, the second blood flow velocity, the first maximum measurable velocity and the second maximum measurable velocity; and
de-aliasing the first blood flow velocity and/or the second blood flow velocity based on the first de-aliasing coefficient to acquire the first projection component of the blood flow velocity vector at the to-be-measured blood flow position at the first transmitting angle; and
wherein the acquiring the second projection component of the blood flow velocity vector at the to-be-measured blood flow position at the second transmitting angle according to the fourth echo signals, the fifth echo signals, the sixth echo signals, the third pulse repetition frequency and the fourth pulse repetition frequency comprises:
acquiring a third blood flow velocity according to the fourth echo signals and the fifth echo signals, and acquiring a fourth blood flow velocity according to the fifth echo signals and the sixth echo signals;
acquiring a third maximum measurable velocity corresponding to the third pulse repetition frequency and a fourth maximum measurable velocity corresponding to the fourth pulse repetition frequency;
determining a second de-aliasing coefficient meeting a second predetermined condition according to the third blood flow velocity, the fourth blood flow velocity, the third maximum measurable velocity and the fourth maximum measurable velocity; and
de-aliasing the third blood flow velocity and/or the fourth blood flow velocity based on the second de-aliasing coefficient to acquire the second projection component of the blood flow velocity vector at the to-be-measured blood flow position at the second transmitting angle.

3. The method according to claim 2,
wherein, the determining the first de-aliasing coefficient meeting the first predetermined condition according to the first blood flow velocity, the second blood flow velocity, the first maximum measurable velocity and the second maximum measurable velocity comprises:
taking a difference value between the first blood flow velocity and the second blood flow velocity as a first difference value;
taking two times of a difference value between N times of the second maximum measurable velocity and M times of the first maximum measurable velocity as a second difference value, where N and M are integers;
taking a difference value between the first difference value and the second difference value as a third difference value; and
calculating to acquire a value result about M and N that minimizes an absolute value of the third difference value, and taking M and/or N in the value result as the first de-aliasing coefficient;
when the value result of M being taken as the first de-aliasing coefficient, de-aliasing the first blood flow velocity based on the first de-aliasing coefficient to acquire the first projection component of blood flow velocity vector at the to-be-measured blood flow position at the first transmitting angle; and when the value result of N being taken as the first de-aliasing coefficient, de-aliasing the second blood flow velocity based on the first de-aliasing coefficient to acquire the first projection component of blood flow velocity vector at the to-be-measured blood flow position at the first transmitting angle; and
wherein, the determining the second de-aliasing coefficient meeting the second predetermined condition according to the third blood flow velocity, the fourth blood flow velocity, the third maximum measurable velocity and the fourth maximum measurable velocity comprises:
taking a difference value between the third blood flow velocity and the fourth blood flow velocity as a fourth difference value;
taking two times of a difference value between N times of the third maximum measurable velocity and M times of the fourth maximum measurable velocity as a fifth difference value, where N and M are integers;
taking a difference value between the fourth difference value and the fifth difference value as a sixth difference value; and
calculating to acquire a value result about M and N that minimizes an absolute value of the sixth difference value, and taking M and/or N in the value result as the second de-aliasing coefficient;
when the value result of M being taken as the second de-aliasing coefficient, de-aliasing the third blood flow velocity based on the second de-aliasing coefficient to acquire the second projection component of blood flow velocity vector at the to-be-measured blood flow position at the second transmitting angle, and when the value result of N being taken as the second de-aliasing coefficient, de-aliasing the fourth blood flow velocity based on the second de-aliasing coefficient to acquire the second projection component of blood flow velocity vector at the to-be-measured blood flow position at the second transmitting angle.

4. The method according to claim 3, wherein
when there are at least two groups of value results about M and N, M and/or N with a minimum absolute value in the value results is taken as the first de-aliasing coefficient when minimizing the absolute value of the third difference value; and
when there are at least two groups of value results about M and N, M and/or N with a minimum absolute value in the value results is taken as the second de-aliasing coefficient when minimizing the absolute value of the sixth difference value.

5. The method according to claim 2, further comprising:
in an echo signal sequence formed by the first echo signals, the second echo signals, the third echo signals, the fourth echo signals, the fifth echo signals and the sixth echo signals, taking echo signals with a same transmitting angle and a same transmission time interval among the echo signals as a group of signals to acquire at least two groups of echo signals, and wall-filtering each group of echo signals, and the wall-filtered echo signals being used to calculate to acquire the first blood flow velocity, the second blood flow velocity, the third blood flow velocity and the fourth blood flow velocity.

6. The method according to claim 1, wherein a transmission sequence of the first ultrasonic waves, the second ultrasonic waves, the third ultrasonic waves, the fourth ultrasonic waves, the fifth ultrasonic waves and the sixth ultrasonic waves is:
the first ultrasonic waves, the fourth ultrasonic waves, the second ultrasonic waves, the fifth ultrasonic waves, the third ultrasonic waves, and the sixth ultrasonic waves; or,
the first ultrasonic waves, the second ultrasonic waves, the fourth ultrasonic waves, the fifth ultrasonic waves, the third ultrasonic waves, and the sixth ultrasonic waves; or,
the first ultrasonic waves, the second ultrasonic waves, the third ultrasonic waves, the fourth ultrasonic waves, the fifth ultrasonic waves, and the sixth ultrasonic waves; or,
the first ultrasonic waves, the fourth ultrasonic waves, the fifth ultrasonic waves, the second ultrasonic waves, the third ultrasonic waves, and the sixth ultrasonic waves; or,
the first ultrasonic waves, the second ultrasonic waves, the fourth ultrasonic waves, the third ultrasonic waves, the fifth ultrasonic waves and the sixth ultrasonic waves; or,
the first ultrasonic waves, the second ultrasonic waves, the fourth ultrasonic waves, the fifth ultrasonic waves, the sixth ultrasonic waves, and the third ultrasonic waves; or,
the first ultrasonic waves, the fourth ultrasonic waves, the second ultrasonic waves, the third ultrasonic waves, the fifth ultrasonic waves, and the sixth ultrasonic waves; or,
the first ultrasonic waves, the fourth ultrasonic waves, the fifth ultrasonic waves, the sixth ultrasonic waves, the second ultrasonic waves, and the third ultrasonic waves; or,
the first ultrasonic waves, the fourth ultrasonic waves, the second ultrasonic waves, the fifth ultrasonic waves, the sixth ultrasonic waves, and the third ultrasonic waves; or,
the first ultrasonic waves, the fourth ultrasonic waves, the fifth ultrasonic waves, the second ultrasonic waves, the sixth ultrasonic waves, and the third ultrasonic waves.

7. The method according to claim 1, wherein the first pulse repetition frequency and the second pulse repetition frequency are prime to each other, and the third pulse repetition frequency and the fourth pulse repetition frequency are prime to each other.

8. The method according to claim 1, wherein a reciprocal of a maximum of the first pulse repetition frequency, the second pulse repetition frequency, the third pulse repetition frequency and the fourth pulse repetition frequency is greater than twice a ratio of an imaging depth of blood flow to a sound velocity of ultrasonic waves propagating in the to-be-measured blood flow.

9. The method according to claim 1, wherein the first pulse repetition frequency is same as the third pulse repetition frequency, and the second pulse repetition frequency is same as the fourth pulse repetition frequency.

10. The method according to claim 1, wherein the receiving echoes of the first, second, third, fourth, fifth, and sixth ultrasonic waves comprises: receiving echoes of the first, second, third, fourth, fifth, and sixth ultrasonic waves at one or more receiving angles.

11. The method according to claim 1, wherein the first ultrasonic waves, the second ultrasonic waves, the third ultrasonic waves, the fourth ultrasonic waves, the fifth ultrasonic waves and the sixth ultrasonic waves are non-focused ultrasonic waves, and the method further comprises:
transmitting focused ultrasonic waves to the to-be-measured blood flow position, and receiving echoes of the focused ultrasonic waves to acquire focused echo signals;
generating a grayscale image of the to-be-measured blood flow position based on the focused echo signals;
generating a blood flow velocity vector graph based on the blood flow velocity vector at the to-be-measured blood flow position; and displaying the grayscale image, and displaying the blood flow velocity vector graph by superimposing on the grayscale image.

12. The method according to claim 11, wherein the focused ultrasonic waves are transmitted between two adjacent of the first ultrasonic waves, the second ultrasonic waves, the third ultrasonic waves, the fourth ultrasonic waves, the fifth ultrasonic waves and the sixth ultrasonic waves.

13. The method according to claim 11, wherein a reciprocal of a minimum of the first pulse repetition frequency, the second pulse repetition frequency, the third pulse repetition frequency and the fourth pulse repetition frequency is a maximum transmission time interval, and the focused ultrasonic waves are transmitted between two ultrasonic waves corresponding to the maximum transmission time interval.

14. The method according to claim 1, further comprising:
transmitting seventh ultrasonic waves, eighth ultrasonic waves and ninth ultrasonic waves to the to-be-measured blood flow position at a third transmitting angle different from the first transmitting angle and the second transmitting angle and receiving echoes of the seventh, eighth, and ninth ultrasonic waves so as to acquire seventh echo signals, eighth echo signals and ninth echo signals, with a fifth pulse repetition frequency between the seventh ultrasonic waves and the eighth ultrasonic waves and a sixth pulse repetition frequency between the eighth ultrasonic waves and the ninth ultrasonic waves, and the fifth pulse repetition frequency being a non-integer multiple of the sixth pulse repetition frequency; and
acquiring a third projection component of the blood flow velocity vector at the to-be-measured blood flow position at the third transmitting angle according to the seventh echo signals, the eighth echo signals, the ninth echo signals, the fifth pulse repetition frequency and the sixth pulse repetition frequency; and
wherein the combining the first projection component and the second projection component to acquire the blood flow velocity vector at the to-be-measured blood flow position comprises:
combining the first projection component, the second projection component and the third projection component to acquire a three-dimensional blood flow velocity vector at the to-be-measured blood flow position.

15. An ultrasonic blood flow imaging method, comprising:
transmitting first ultrasonic waves, second ultrasonic waves, third ultrasonic waves and fourth ultrasonic waves to a to-be-measured blood flow position of a target object at a first transmitting angle and receiving echoes of the first, second, third, and fourth ultrasonic waves so as to acquire first echo signals, second echo signals, third echo signals and fourth echo signals, with a first pulse repetition frequency between the first ultrasonic waves and the second ultrasonic waves and a second pulse repetition frequency between the third ultrasonic waves and the fourth ultrasonic waves, and the first pulse repetition frequency being a non-integer multiple of the second pulse repetition frequency;
transmitting fifth ultrasonic waves, sixth ultrasonic waves, seventh ultrasonic waves and eighth ultrasonic waves to the to-be-measured blood flow position at a second transmitting angle different from the first transmitting angle and receiving echoes of the fifth, sixth, seventh, and eighth ultrasonic waves so as to acquire fifth echo signals, sixth echo signals, seventh echo signals and eighth echo signals, with a third pulse repetition frequency between the fifth ultrasonic waves and the sixth ultrasonic waves and a fourth pulse repetition frequency between the seventh ultrasonic waves and the eighth ultrasonic waves, the third pulse repetition frequency being a non-integer multiple of the fourth pulse repetition frequency;
acquiring a first projection component of a blood flow velocity vector at the to-be-measured blood flow position at the first transmitting angle according to the first echo signals, the second echo signals, the third echo signals, the fourth echo signals, the first pulse repetition frequency and the second pulse repetition frequency;
acquiring a second projection component of the blood flow velocity vector at the to-be-measured blood flow position at the second transmitting angle according to the fifth echo signals, the sixth echo signals, the seventh echo signals, the eighth echo signals, the third pulse repetition frequency and the fourth pulse repetition frequency; and
combining the first projection component and the second projection component to acquire the blood flow velocity vector at the to-be-measured blood flow position.

16. The method according to claim 15, wherein the acquiring the first projection component of the blood flow velocity vector at the to-be-measured blood flow position at the first transmitting angle according to the first echo signals, the second echo signals, the third echo signals, the fourth echo signals, the first pulse repetition frequency and the second pulse repetition frequency comprises:
acquiring a first blood flow velocity according to the first echo signals and the second echo signals, and acquiring a second blood flow velocity according to the third echo signals and the fourth echo signals;
acquiring a first maximum measurable velocity corresponding to the first pulse repetition frequency and a second maximum measurable velocity corresponding to the second pulse repetition frequency;
determining a first de-aliasing coefficient meeting a first predetermined condition according to the first blood flow velocity, the second blood flow velocity, the first maximum measurable velocity and the second maximum measurable velocity; and
de-aliasing the first blood flow velocity and/or the second blood flow velocity based on the first de-aliasing coefficient to acquire the first projection component of the blood flow velocity vector at the to-be-measured blood flow position at the first transmitting angle; and
wherein, the acquiring the second projection component of the blood flow velocity vector at the to-be-measured blood flow position at the second transmitting angle according to the fifth echo signals, the sixth echo signals, the seventh echo signals, the eighth echo signals, the third pulse repetition frequency and the fourth pulse repetition frequency comprises:
acquiring a third blood flow velocity according to the fifth echo signals and the sixth echo signals, and acquiring a fourth blood flow velocity according to the seventh echo signals and the eighth echo signals;
acquiring a third maximum measurable velocity corresponding to the third pulse repetition frequency and a fourth maximum measurable velocity corresponding to the fourth pulse repetition frequency;
determining a second de-aliasing coefficient meeting a second predetermined condition according to the third blood flow velocity, the fourth blood flow velocity, the third maximum measurable velocity and the fourth maximum measurable velocity; and de-aliasing the third blood flow velocity and/or the fourth blood flow velocity based on the second de-aliasing coefficient to acquire the second projection component of the blood flow velocity vector at the to-be-measured blood flow position at the second transmitting angle.

17. The method according to claim 16, wherein, the determining the first de-aliasing coefficient meeting the first predetermined condition according to the first blood flow velocity, the second blood flow velocity, the first maximum measurable velocity and the second maximum measurable velocity comprises:

taking a difference value between the first blood flow velocity and the second blood flow velocity as a first difference value;

taking two times of a difference value between N times of the second maximum measurable velocity and M times of the first maximum measurable velocity as a second difference value, where N and M are integers;

taking a difference value between the first difference value and the second difference value as a third difference value; and calculating to acquire a value result about M and N that minimizes an absolute value of the third difference value, and taking M and/or N in the value result as the first de-aliasing coefficient;

when the value result of M being taken as the first de-aliasing coefficient, de-aliasing the first blood flow velocity based on the first de-aliasing coefficient to acquire the first projection component of blood flow velocity vector at the to-be-measured blood flow position at the first transmitting angle; and when the value result of N being taken as the first de-aliasing coefficient, de-aliasing the second blood flow velocity based on the first de-aliasing coefficient to acquire the first projection component of blood flow velocity vector at the to-be-measured blood flow position at the first transmitting angle; and wherein, the determining the second de-aliasing coefficient meeting the second predetermined condition according to the third blood flow velocity, the fourth blood flow velocity, the third maximum measurable velocity and the fourth maximum measurable velocity comprises:

taking a difference value between the third blood flow velocity and the fourth blood flow velocity as a fourth difference value;

taking two times of a difference value between N times of the third maximum measurable velocity and M times of the fourth maximum measurable velocity as a fifth difference value, where N and M are integers;

taking a difference value between the fourth difference value and the fifth difference value as a sixth difference value; and calculating to acquire a value result about M and N that minimizes an absolute value of the sixth difference value, and taking M and/or N in the value result as the second de-aliasing coefficient;

when the value result of M being taken as the second de-aliasing coefficient, de-aliasing the third blood flow velocity based on the second de-aliasing coefficient to acquire the second projection component of blood flow velocity vector at the to-be-measured blood flow position at the second transmitting angle; and when the value result of N being taken as the second de-aliasing coefficient, de-aliasing the fourth blood flow velocity based on the second de-aliasing coefficient to acquire the second projection component of blood flow velocity vector at the to-be-measured blood flow position at the second transmitting angle.

18. An ultrasonic blood flow imaging method, comprising:

transmitting first ultrasonic waves, second ultrasonic waves and third ultrasonic waves to a to-be-measured blood flow position of a target object at a first transmitting angle and receiving echoes of the first, second, and third ultrasonic waves so as to acquire first echo signals, second echo signals and third echo signals, with a first pulse repetition frequency between the first ultrasonic waves and the second ultrasonic waves and a second pulse repetition frequency between the second ultrasonic waves and the third ultrasonic waves, and the first pulse repetition frequency being a non-integer multiple of the second pulse repetition frequency;

transmitting fourth ultrasonic waves, fifth ultrasonic waves, sixth ultrasonic waves and seventh ultrasonic waves to the to-be-measured blood flow position at a second transmitting angle different from the first transmitting angle and receiving echoes of the fourth, fifth, sixth, and seventh ultrasonic waves so as to acquire fourth echo signals, fifth echo signals, sixth echo signals and seventh echo signals, with a third pulse repetition frequency between the fourth ultrasonic waves and the fifth ultrasonic waves and a fourth pulse repetition frequency between the sixth ultrasonic waves and the seventh ultrasonic waves, and the third pulse repetition frequency being a non-integer multiple of the fourth pulse repetition frequency;

acquiring a first projection component of a blood flow velocity vector at the to-be-measured blood flow position at the first transmitting angle according to the first echo signals, the second echo signals, the third echo signals, the first pulse repetition frequency and the second pulse repetition frequency;

acquiring a second projection component of the blood flow velocity vector at the to-be-measured blood flow position at the second transmitting angle according to the fourth echo signals, the fifth echo signals, the sixth echo signals, the seventh echo signals, the third pulse repetition frequency and the fourth pulse repetition frequency; and combining the first projection component and the second projection component to acquire the blood flow velocity vector at the to-be-measured blood flow position.

19. The method according to claim 18, wherein said acquiring the first projection component of the blood flow velocity vector at the to-be-measured blood flow position at the first transmitting angle according to the first echo signals, the second echo signals, the third echo signals, the first pulse repetition frequency and the second pulse repetition frequency comprises:

acquiring a first blood flow velocity according to the first echo signals and the second echo signals, and acquiring a second blood flow velocity according to the second echo signals and the third echo signals;

acquiring a first maximum measurable velocity corresponding to the first pulse repetition frequency and a second maximum measurable velocity corresponding to the second pulse repetition frequency;

determining a first de-aliasing coefficient meeting a first predetermined condition according to the first blood flow velocity, the second blood flow velocity, the first maximum measurable velocity and the second maximum measurable velocity; and de-aliasing the first blood flow velocity and/or the second blood flow velocity based on the first de-aliasing coefficient to acquire the first projection component of the blood flow velocity vector at the to-be-measured blood flow position at the first transmitting angle; and wherein, said acquiring the second projection component of the blood flow velocity vector at the to-be-measured blood flow position at the second transmitting angle according to the fourth echo signals, the fifth echo signals, the sixth echo signals, the seventh echo signals, the third pulse repetition frequency and the fourth pulse repetition frequency comprises:

acquiring a third blood flow velocity according to the fourth echo signals and the fifth echo signals, and acquiring a fourth blood flow velocity according to the sixth echo signals and the seventh echo signals;

acquiring a third maximum measurable velocity corresponding to the third pulse repetition frequency and a fourth maximum measurable velocity corresponding to the fourth pulse repetition frequency;

determining a second de-aliasing coefficient meeting a second predetermined condition according to the third blood flow velocity, the fourth blood flow velocity, the third maximum measurable velocity and the fourth maximum measurable velocity; and de-aliasing the third blood flow velocity and/or the fourth blood flow velocity based on the second de-aliasing coefficient to acquire the second projection component of the blood flow velocity vector at the to-be-measured blood flow position at the second transmitting angle.

20. The method according to claim 19, wherein, said determining the first de-aliasing coefficient meeting the first predetermined condition according to the first blood flow velocity, the second blood flow velocity, the first maximum measurable velocity and the second maximum measurable velocity comprises:

taking a difference value between the first blood flow velocity and the second blood flow velocity as a first difference value;

taking two times of a difference value between N times of the second maximum measurable velocity and M times of the first maximum measurable velocity as a second difference value, where N and M are integers;

taking a difference value between the first difference value and the second difference value as a third difference value; and calculating to acquire a value result about M and N that minimizes an absolute value of the third difference value, and taking M and/or N in the value result as the first de-aliasing coefficient;

when the value result of M being taken as the first de-aliasing coefficient, de-aliasing the first blood flow velocity based on the first de-aliasing coefficient to acquire the first projection component of blood flow velocity vector at the to-be-measured blood flow position at the first transmitting angle; and when the value result of N being taken as the first de-aliasing coefficient, de-aliasing the second blood flow velocity based on the first de-aliasing coefficient to acquire the first projection component of blood flow velocity vector at the to-be-measured blood flow position at the first transmitting angle; and wherein, said determining the second de-aliasing coefficient meeting the second predetermined condition according to the third blood flow velocity, the fourth blood flow velocity, the third maximum measurable velocity and the fourth maximum measurable velocity comprises:

taking a difference value between the third blood flow velocity and the fourth blood flow velocity as a fourth difference value;

taking two times of a difference value between N times of the third maximum measurable velocity and M times of the fourth maximum measurable velocity as a fifth difference value, where N and M are integers;

taking a difference value between the fourth difference value and the fifth difference value as a sixth difference value; and calculating to acquire a value result about M and N that minimizes an absolute value of the sixth difference value, and taking M and/or N in the value result as the second de-aliasing coefficient;

when the value result of M being taken as the second de-aliasing coefficient, de-aliasing the third blood flow velocity based on the second de-aliasing coefficient to acquire the second projection component of blood flow velocity vector at the to-be-measured blood flow position at the second transmitting angle; and when the value result of N being taken as the second de-aliasing coefficient, de-aliasing the fourth blood flow velocity based on the second de-aliasing coefficient to acquire the second projection component of blood flow velocity vector at the to-be-measured blood flow position at the second transmitting angle.

* * * * *